(12) United States Patent
Minami et al.

(10) Patent No.: US 8,116,513 B2
(45) Date of Patent: Feb. 14, 2012

(54) IMAGE PROCESSING METHOD, IMAGE PROCESSING APPARATUS, DOCUMENT READING APPARATUS, IMAGE FORMING APPARATUS, AND RECORDING MEDIUM

(75) Inventors: Masanori Minami, Nara (JP); Masakazu Ohira, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 1183 days.

(21) Appl. No.: 11/902,029

(22) Filed: Sep. 18, 2007

(65) Prior Publication Data
US 2008/0069450 A1    Mar. 20, 2008

(30) Foreign Application Priority Data

Sep. 19, 2006  (JP) .................................. 2006-253143
Aug. 24, 2007  (JP) .................................. 2007-218864

(51) Int. Cl.
*G06K 9/00* (2006.01)
*H04N 1/40* (2006.01)

(52) U.S. Cl. ........................................ 382/100; 358/448

(58) Field of Classification Search .................. 382/100, 382/181, 190, 195, 199, 162, 168, 235; 358/3.23, 358/448, 462, 530; 701/28, 102
See application file for complete search history.

(56) References Cited

U.S. PATENT DOCUMENTS

| | | | | |
|---|---|---|---|---|
| 5,465,353 A | * | 11/1995 | Hull et al. | 1/1 |
| 5,754,683 A | * | 5/1998 | Hayashi et al. | 382/167 |
| 5,799,115 A | * | 8/1998 | Asano et al. | 382/305 |
| 6,665,096 B1 | * | 12/2003 | Oh | 358/461 |
| 7,233,945 B2 | * | 6/2007 | Shiiyama | 1/1 |
| 2008/0049264 A1 | | 2/2008 | Morimoto et al. | |

FOREIGN PATENT DOCUMENTS

| | | |
|---|---|---|
| CN | 1218917 A | 6/1999 |
| JP | 4-150253 A | 5/1992 |
| JP | 4-299787 A | 10/1992 |
| JP | 3469345 B2 | 9/2003 |
| JP | 2003-323553 A | 11/2003 |
| JP | 2005-167481 A | 6/2005 |
| WO | WO-2006/092957 A1 | 9/2006 |

OTHER PUBLICATIONS

Tomohiro Nakai, et al. "Document Image Retrieval and Removal of Perspective Distortion Based on Voting for Cross-Ratios" MIRU 2005 pp. 538-545.

* cited by examiner

*Primary Examiner* — Abolfazl Tabatabai
(74) *Attorney, Agent, or Firm* — Birch, Stewart, Kolasch & Birch, LLP

(57) ABSTRACT

A document matching process section calculates feature points (e.g., the centroid) on the basis of an inputted document image, then selects a plurality of feature points from among the calculated feature points, and then calculates a hash value on the basis of the selected feature points. Then, on the basis of the calculated features, the document matching process section determines whether the document image is similar to a stored format (stored image) stored. When it is determined as being similar, the document matching process section determines whether the entry omission is present in a part in the document image corresponding to a part defined in the stored image, and then outputs the determination result.

19 Claims, 40 Drawing Sheets

FIG.4

| -3 | -3 | -1 | 1  | -1 | -2 | -3 |
|----|----|----|----|----|----|----|
| -2 | -2 | 1  | 4  | 1  | -2 | -2 |
| -1 | 1  | 8  | 15 | 8  | 1  | -1 |
| 1  | 5  | 16 | 25 | 16 | 5  | 1  |
| -1 | 1  | 8  | 15 | 8  | 1  | -1 |
| -2 | -2 | 1  | 4  | 1  | -2 | -2 |
| -3 | -2 | -1 | 1  | -1 | -2 | -3 |

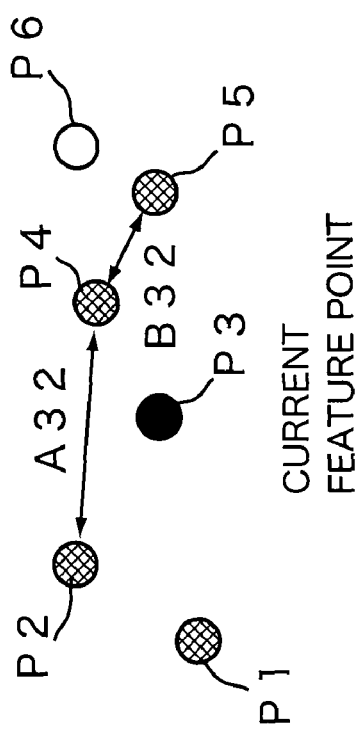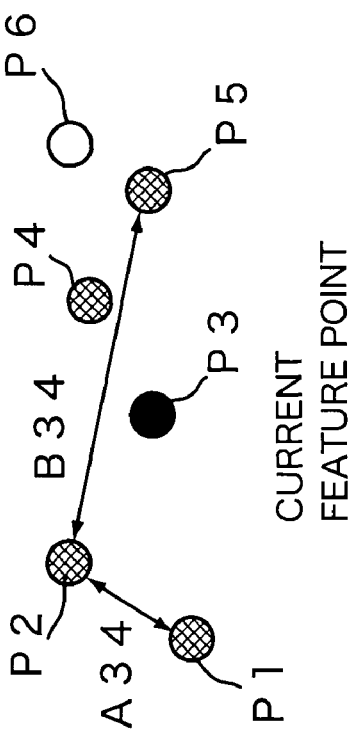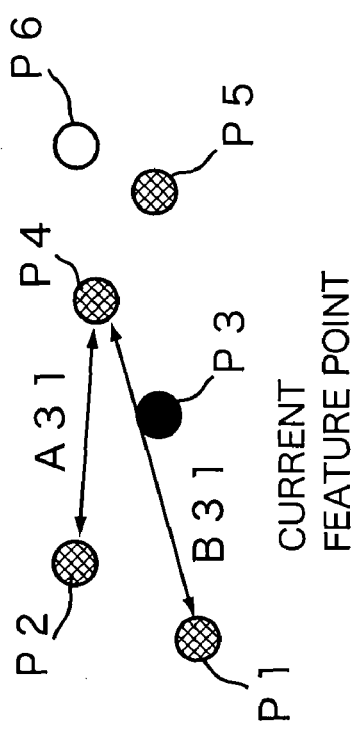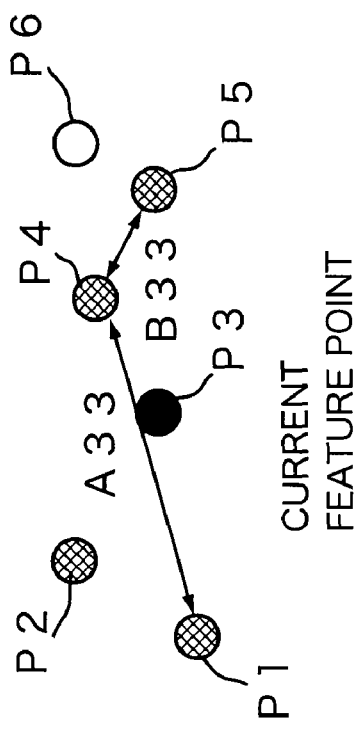

FIG.12

| INDEX OF FEATURE POINT IN DOCUMENT IMAGE | HASH VALUE | COORDINATE |
|---|---|---|
| p1 | H1 | (x11', y11') |
| p2 | H8 | (x32', y32') |
| p3 | H3 | (x13', y13') |
| p4 | H4 | (x14', y14') |
| p5 | H9 | (x35', y35') |
| p6 | H6 | (x26', y26') |
| p7 | H7 | (x17', y17') |
| ⋮ | ⋮ | ⋮ |

| HASH VALUE | INDEX OF DOCUMENT |
|---|---|
| H1 | ID1,f11 |
| H2 | ID1,f12 |
| H3 | ID1,f13, ID2, f21 |
| H4 | ID1,f14 |
| H5 | ID1,f15 |
| ... | ... |

| HASH VALUE | INDEX OF DOCUMENT |
|---|---|
| H1 | ID1,f11, ID1,f15 |
| H2 | ID1,f12 |
| H3 | ID1,f13, ID2,f21 |
| H4 | ID1,f14 |
| ... | ... |

| INDEX OF DOCUMENT | INDEX OF FEATURE POINT | COORDINATE |
|---|---|---|
| ID1 | f11 | (x11, y11) |
| | f12 | (x12, y12) |
| | f13 | (x13, y13) |
| | f14 | (x14, y14) |
| | ⋮ | ⋮ |
| ID2 | f21 | (x21, y21) |
| | f22 | (x22, y22) |
| | f23 | (x23, y23) |
| | f24 | (x24, y24) |
| | ⋮ | ⋮ |

INDEX OF DOCUMENT 2264

| | ID1 | ID2 | ID3 | ID4 | ···IDn |
|---|---|---|---|---|---|
| fn1 | p1 | | | | |
| fn2 | | | p2 | | |
| fn3 | p3 | | | | |
| fn4 | p4 | | | | |
| fn5 | | | p5 | | |
| fn6 | | p6 | | | |
| fn7 | p7 | | | | |

INDEX OF FEATURE POINT IN STORED FORMAT

| INDEX OF DOCUMENT | ITEM NAME | COORDINATE 2265 |
|---|---|---|
| ID1 | DATE | (x1,y1), (X2,y2) |
|  | NAME | (x3,y3), (X4,y4) |
|  | ADDRESS | (x5,y5), (X6,y6) |
|  | TEL No. | (x7,y7), (X8,y8) |
| ID2 | ... | ... |
| ID3 | ... | ... |
|  | ... | ... |
| ⋮ | ⋮ | ⋮ |

FIG.21

| INDEX OF DOCUMENT | ITEM NAME | COORDINATE |
|---|---|---|
| ID1 | DATE | (x1,y1), (X2,y2) |
| | NAME | (x3,y3), (X4,y4) |
| | SIGNATURE | (x0,y0), (X9,y9) |
| | ADDRESS | (x5,y5), (X6,y6) |
| | TEL No. | (x7,y7), (X8,y8) |
| ID2 | ・・・ | ・・・ |
| ID3 | ・・・ | ・・・ |
| | ・・・ | ・・・ |
| ⋮ | ⋮ | ⋮ |

FIG.30A

DOCUMENT ( DOCUMENT NAME xxx )
HAS ENTRY OMISSION.

FIG.30B

NAME FIELD IN DOCUMENT
( DOCUMENT NAME xxx ) IS NOT FILLED IN.

FIG.30C

PAGE OO OF DOCUMENT HAS
ENTRY OMISSION.

FIG.30D

DOCUMENT XX HAS ENTRY OMISSION.
THAT WAS DELIVERED IN A MANNER
SEPARATED FROM THE OTHER DOCUMENT.

IMAGE PROCESSING METHOD, IMAGE PROCESSING APPARATUS, DOCUMENT READING APPARATUS, IMAGE FORMING APPARATUS, AND RECORDING MEDIUM

CROSS-REFERENCE TO RELATED APPLICATIONS

This Nonprovisional application claims priority under 35 U.S.C. §119(a) on Patent Application No. 2006-253143 and No. 2007-218864 filed in Japan on Sep. 19, 2006 and Aug. 24, 2007 respectively, the entire contents of which are hereby incorporated by reference.

BACKGROUND

1. Technical Field

The present application relates to: an image processing method and an image processing apparatus for performing determination processing whether an obtained document image is similar to a stored image stored; a document reading apparatus and an image forming apparatus employing the image processing apparatus; and a recording medium for storing a computer program for implementing the image processing.

2. Description of the Related Art

Proposed methods for processing of reading a document with a scanner and then determining whether the read document image is similar to a format stored include: a method in which keywords are extracted from an image read by an OCR and then pattern matching is performed on the basis of the extracted keywords; and a method in which documents of determination target are restricted to formatted documents with ruled lines and pattern matching is performed on the basis of information concerning the ruled lines extracted from the read document.

In storing a format to be used in similarity determination, recognition processing such as line segment extraction, character box extraction, character recognition, or frame extraction is performed on an input image inputted for registration. Then, from the recognition result, information (e.g., a feature point) such as the center coordinates of frame data, the center coordinates of a character string frame, and connecting frame information is extracted. After that, a features (e.g., a hash value) are calculated from the extracted information. Then, data (such as a features, a model name, and a parameter used for calculating the features) necessary for table management is generated and stored into a hash table, so that the format is stored.

In similarity determination for a document, recognition processing is performed on the inputted document image. Then, from the recognition result, information (e.g., a feature point) such as the center coordinates of frame data, the center coordinates of a character string frame, and connecting frame information is extracted. After that, a features (e.g., a hash value) corresponding to each information is calculated. Then, using the calculated features, an area of the hash table stored is searched, and vote is performed for each stored form name in the searched area. This processing is repeated for each feature point of the inputted document image, so that similarity is calculated by adopting as a recognition result a model which is the largest in a histogram. When the document image is recognized as being similar to a stored format, the document image is saved in a state that an identifier is imparted. Employing such processing, a filing apparatus for images (document images) is proposed that automatically performs matching between a document image and a stored format so as to reduce the user's work in the processing step (see Japanese Patent Publication No. 3469345).

Nevertheless, in the apparatus described in Japanese Patent Publication No. 3469345, stored formats used in similarity determination for a document image are documents in each of which a format (such as frames, ruled lines, and character strings that indicate entry items) is defined, that is, documents in which nothing is entered in the entry fields of each document. Thus, the features (e.g., a hash value) extracted from each stored format does not contain information (e.g., a feature point) concerning the items (e.g., character strings, figures, and marks) to be entered as the entry items. Accordingly, even a document image with omission in which necessary information is not written in the entry fields of the inputted document image can be determined as being similar to a stored format. This has caused a problem that in spite of the omission in the document image, the inputted document image is filed intact. Thus, it has been desired to determine omission in a document image with satisfactory accuracy.

SUMMARY

The present invention has been devised in view of this situation. An object of the present invention is to provide an image processing method and an image processing apparatus in which a part or a plurality of parts in a stored image are defined in advance, and in which when a document image is determined as being similar to the stored image, it is determined whether omission is present in a part in the document image corresponding to a part defined in the stored image, and then the determination result is outputted, so that in similarity determination for a document image, determination of omission in the document image is achieved with satisfactory accuracy. Also provided are: a document reading apparatus and an image forming apparatus employing the image processing apparatus; and a recording medium for storing a computer program for implementing the image processing.

Another object of the present invention is to provide: an image processing method and an image processing apparatus in which a part with omission in a document image determined as having omission is notified so that the part with omission can easily be determined; and a document reading apparatus and an image forming apparatus employing the image processing apparatus.

Another object of the present invention is to provide: an image processing apparatus in which presence or absence of omission is determined on the basis of a document image having undergone the page background removing so that omission can be determined with the still more satisfactory accuracy; and a document reading apparatus and an image forming apparatus employing the image processing apparatus.

Another object of the present invention is to provide an image processing apparatus in which: a pixel value of each pixel in a first pixel block containing a current pixel in the obtained document image is calculated on the basis of a pixel value of each pixel in a second pixel block containing the individual pixels in the first pixel block; whether the current pixel is an edge pixel is determined on the basis of distribution of the calculated pixel values of the individual pixels in said first pixel block; and whether the obtained document image has omission is determined on the basis of the number of determined edge pixels; so that determination of omission in the document image is achieved with satisfactory accuracy without the necessity of comparison between the pixel values of the document image and the stored image. Also provided are: a document reading apparatus and an image forming apparatus employing the image processing apparatus.

Another object of the present invention is to provide: an image processing apparatus in which calculation of the pixel value of each pixel in a first pixel block continuing a current pixel and determination whether the current pixel is an edge pixel are performed separately for each color component, so that determination accuracy in omission is improved; and a document reading apparatus and an image forming apparatus employing the image processing apparatus.

Another object of the present invention is to provide a document reading apparatus that has delivery means for delivering in a sorted manner a document with omission when an obtained document image is determined as having omission, and hence can sort out documents with omission from documents without omission.

Another object of the present invention is to provide a document reading apparatus having a configuration that delivery means displaces the delivery position for a document with omission, so that documents with omission can easily be sorted out from documents without omission.

An image processing method according to the present invention is characterized by an image processing method for determining presence or absence of omission in an obtained document image, comprising the steps of determining whether the obtained document image is similar to a stored image stored; when the document image is determined as being similar to the stored image, determining whether omission is present in a part or parts in the obtained document image corresponding to a part or a plurality of parts defined in said stored image; and outputting a determination result.

The image processing method according to the present invention is characterized by an image processing method comprising the step of notifying the part with omission in the document image determined as having omission.

An image processing apparatus according to the present invention is characterized by an image processing apparatus for determining presence or absence of omission in an obtained document image, comprising: a similarity determination processing section for determining whether the obtained document image is similar to a stored image stored; an entry item determination processing section that, when the document image is determined as being similar to the stored image, determines whether omission is present in a part or parts in the obtained document image corresponding to a part or a plurality of parts defined in said stored image; and a determination result output section for outputting a determination result.

The image processing apparatus according to the present invention is characterized by an image processing apparatus comprising a notification section for notifying the part with omission in a document image determined as having omission.

The image processing apparatus according to the present invention is characterized by an image processing apparatus comprising a page background removing section for removing the page background in the obtained document image, wherein said entry item determination processing section determines presence or absence of omission on the basis of the document image in which the page background has been removed by said page background removing section.

The image processing apparatus according to the present invention is characterized by an image processing apparatus comprising: a pixel value calculating section for calculating a pixel value of each pixel in a first pixel block containing a current pixel in the obtained document image, on the basis of a pixel value of each pixel in a second pixel block containing the current pixel; and an edge pixel determining section for determining whether said current pixel is an edge pixel on the basis of distribution of the calculated pixel values of the individual pixels in said first pixel block; wherein said entry item determination processing section determines whether the obtained document image has omission, on the basis of the number of current pixels determined as an edge pixel by said edge pixel determining section.

The image processing apparatus according to the present invention is characterized by an image processing apparatus wherein when the obtained document image is a color image, each of said pixel value calculating section and said edge pixel determining section performs processing separately for each color component.

A document reading apparatus according to the present invention is characterized by a document reading apparatus comprising: a document reading section for reading a plurality of documents; an image processing apparatus described above; and a document delivery section for delivering in a sorted manner a document with omission when the image processing apparatus determines that the document image read by said document reading section has omission.

The document reading apparatus according to the present invention is characterized by a document reading apparatus wherein said document delivery section displaces a delivery position for a document with omission relative to a delivery position for a document without omission.

An image forming apparatus according to the present invention is characterized by an image forming apparatus comprising: an image processing apparatus described above; and an image forming section for forming an output image on the basis of the image processed by the image processing apparatus.

A recording medium according to the present invention is characterized by a recording medium storing thereon a computer program executable to perform the steps of causing a computer to determine whether the obtained document image is similar to a stored image stored; and when the document image is determined as being similar to the stored image, causing a computer to determine whether omission is present in a part or parts in the obtained document image corresponding to a part or a plurality of parts defined in said stored image.

In the present invention, it is determined whether an obtained document image is similar to a stored image stored. Then, when the document image is determined as being similar to the stored image, it is determined whether omission is present in a part or parts in the obtained document image corresponding to a part or a plurality of parts defined in advance in the stored image similar to the document image. Then, the determination result (the presence or absence of omission) is outputted. The parts defined in advance are, for example, entry fields in a document (format) in which a format (such as frames, ruled lines, and character strings that indicate entry items) is defined, that is, parts where characters, figures, marks, and the like are to be written as entry items. Since parts where characters and the like are to be written are defined in advance in the stored image, omission can be determined only in the parts where characters and the like are to be written, out of the entirety of the obtained document image. This permits accurate determination whether the document image has omission (erroneous entry omission). Here, in the present invention, the obtained document image indicates: a document image obtained by reading a document image with a scanner; a document image in the form of electronic data generated by writing necessary information into data of a predetermined format with a computer;

and electronized data generated by converting data read with a scanner into a predetermined file format such as JPEG.

Further, in the present invention, a part with omission in a document image determined as having omission is notified. For example, when the part with omission in the document image is displayed, this permits easy recognition of not only the presence of omission in the document but also the position of the part with omission in the document. In particular, for example, in a case that a large number of entry items are present in a single document sheet, or alternatively in a case that a large number of documents are to be read, omission can easily be recognized so that the user's convenience is improved.

Further, in the present invention, the page background removing is performed on the obtained document image, and then the presence or absence of omission is determined on the basis of the document image in which the page background has been removed. Thus, even in a case that the paper sheet material of the read document is different from that of the stored image like recycled paper and thinly colored paper, the presence or absence of omission can be determined with satisfactory accuracy.

Further, in the present invention, the pixel value of each pixel in a first pixel block containing a current pixel in the obtained document image is calculated on the basis of the pixel value of each pixel in a second pixel block containing the individual pixels in the first pixel block. Then, whether the current pixel is an edge pixel is determined on the basis of distribution of the calculated pixel values of the individual pixels in said first pixel block. Further, whether the obtained document image has omission is determined on the basis of the number of determined edge pixels. This permits determination of omission (erroneous entry omission) in the document image with satisfactory accuracy only on the basis of the obtained document image without the necessity of comparison of the pixel values of the document image and the stored image. Here, in the present invention, the obtained document image indicates: a document image obtained by reading a document image with a scanner; a document image in the form of electronic data generated by writing necessary information into data of a predetermined format with a computer; and electronized data generated by converting data read with a scanner into a predetermined file format such as JPEG.

Further, in the present invention, when the obtained document image is a color image, calculation of the pixel value of each pixel in a first pixel block continuing a current pixel and determination whether the current pixel is an edge pixel are performed separately for each color component. This suppresses the influence of isolated points in the document image and noise at the time of reading and the influence of dirt in the base sheet of the document or dust adhering to the base sheet. Accordingly, determination accuracy for omission is improved further.

Further, in the present invention, when the obtained document image is determined as having omission, delivery means delivers a document with omission in a sorted manner. Thus, for example, when a large number of documents are to be read, documents with omission and documents without omission are delivered in a sorted manner. This allows a user to easily sort out documents with omission from a large number of delivered documents.

Further, in the present invention, the delivery means displaces the delivery position for documents with omission. This allows documents with omission to easily be sorted from the delivered documents.

In the present invention, a part or a plurality of parts in the stored image is defined in advance. Then, when the document image is determined as being similar to the stored image, it is determined whether omission is present in a part in the document image corresponding to a part defined in the stored image, and then the determination result is outputted. By virtue of this, in similarity determination for the document image, omission in the document image can be determined with satisfactory accuracy.

Further, in the present invention, a part with omission in a document image determined as having omission is notified so that the part with omission can easily be determined.

Further, in the present invention, in a preceding stage to the determination whether the obtained document image has omission, the page background of the document image is removed. By virtue of this, even in a case that the paper sheet material of the read document is different from that of the stored image like recycled paper and thinly colored paper, the presence or absence of omission can be determined with satisfactory accuracy.

Further, in the present invention, the pixel value of each pixel in a first pixel block containing a current pixel in the obtained document image is calculated on the basis of the pixel value of each pixel in a second pixel block containing the individual pixels in the first pixel block. Then, whether the current pixel is an edge pixel is determined on the basis of distribution of the calculated pixel values of the individual pixels in said first pixel block. Further, whether the obtained document image has omission is determined on the basis of the number of determined edge pixels. This permits determination of omission in the document image with satisfactory accuracy only on the basis of the obtained document image without the necessity of comparison of the pixel values of the document image and the stored image.

Further, in the present invention, when the obtained document image is a color image, calculation of the pixel value of each pixel in a first pixel block continuing a current pixel and determination whether the current pixel is an edge pixel are performed separately for each color component. This suppresses the influence of isolated points in the document image and noise at the time of reading and the influence of dirt in the base sheet of the document or dust adhering to the base sheet. Accordingly, determination accuracy for omission is improved further.

Further, in the present invention, delivery means is provided that delivers in a sorted manner a document with omission when the obtained document image is determined as having omission. This permits sorting into documents with omission and documents without omission. In particular, in a case that a large number of documents are to be read, documents with omission are easily sorted from among a large number of delivered documents. This improves the user's convenience.

Further, in the present invention, the delivery means displaces the delivery position for documents with omission. This allows documents with omission to easily be sorted.

The above and further objects and features of the invention will more fully be apparent from the following detailed description with accompanying drawings.

BRIEF DESCRIPTION OF THE SEVERAL VIEWS OF THE DRAWINGS

FIG. 4 is an explanation diagram showing an example of a filter coefficient of a filtering section;

FIGS. 10A to 10D are explanation diagrams showing another example of calculation of an invariant with respect to a current feature point of;

FIG. 12 is an explanation diagram showing a structure of a feature point coordinate table for a document image;

FIGS. 13A and 13B are explanation diagrams showing a structure of a hash table for a stored format;

FIG. 14 is an explanation diagram showing a structure of a feature point coordinate table for a stored format;

FIG. 15 is an explanation diagram showing a structure of a feature point vote table;

FIG. 21 is an explanation diagram showing another example of a determination area table indicating entry omission determination regions;

FIGS. 30A to 30D are explanation diagrams showing examples of screen display that notifies entry omission;

DETAILED DESCRIPTION

Embodiments are described below in detail with reference to the drawings.

Embodiment 1

Figure 1:
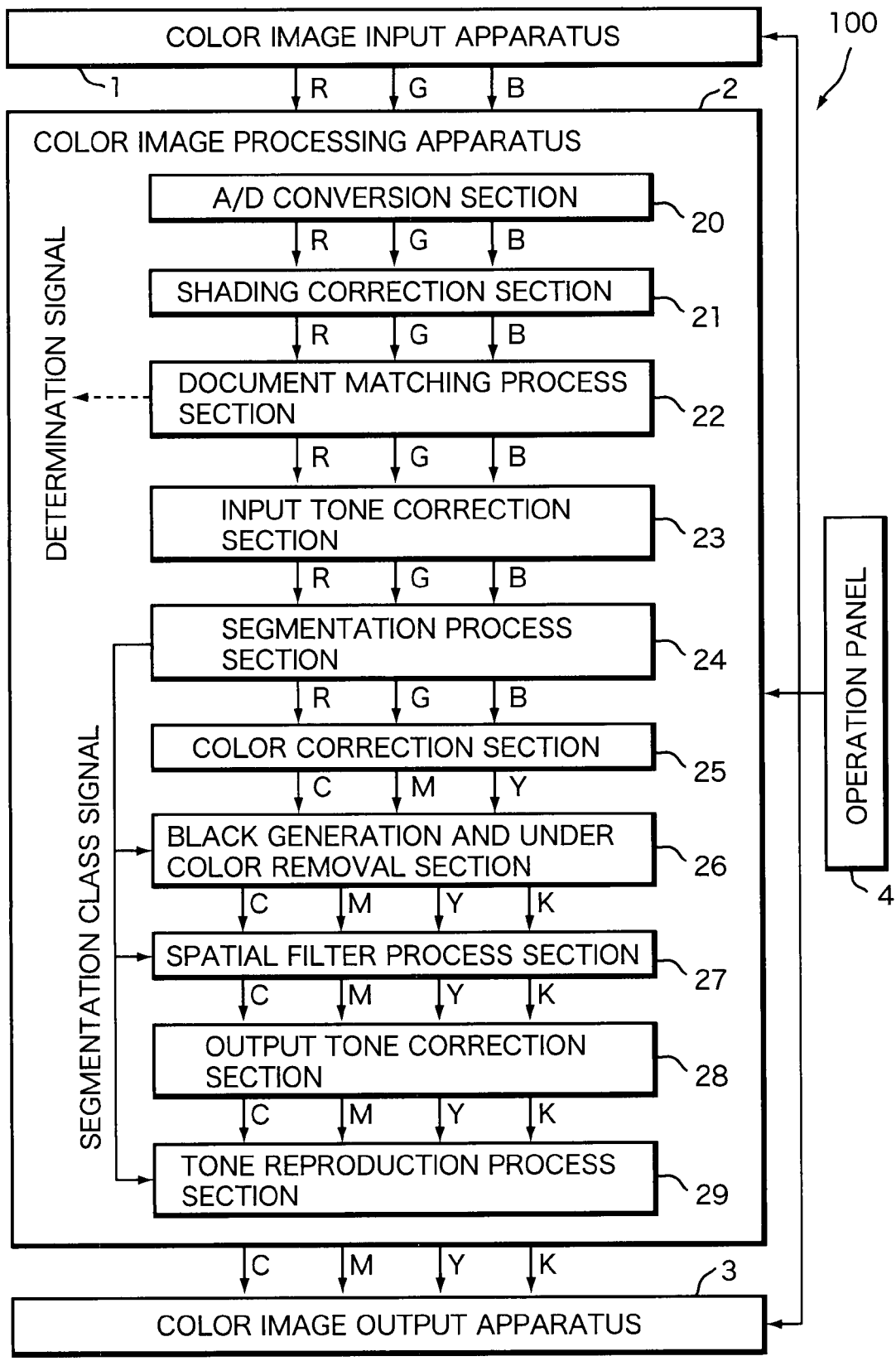
FIG. 1 is a block diagram showing a configuration of an image forming apparatus employing an image processing apparatus according to the present invention.

The present invention is described below with reference to the drawings illustrating an embodiment. FIG. 1 is a block diagram showing the configuration of an image forming apparatus 100 employing an image processing apparatus according to the present invention. The image forming apparatus 100 (e.g., a digital color copying machine or a combined machine provided with a compound function such as a printer function, a filing function, and a facsimile and e-mail distribution function) includes a color image input apparatus 1, a color image processing apparatus 2 (an image processing apparatus), a color image output apparatus 3 serving as image forming means, and an operation panel 4 for various kinds of operation.

Image data of analog signals of RGB (R: red, G: green, B: blue) obtained when the color image input apparatus 1 reads a document is outputted to the color image processing apparatus 2, then processed by predetermined processing in the color image processing apparatus 2, and then outputted to the color image output apparatus 3 as digital color signals of CMYK (C: cyan, M: magenta, Y: yellow, K: black).

The color image input apparatus 1 is, for example, a scanner provided with a CCD (Charged Coupled Device). The color image input apparatus 1 reads a reflected light image from the document image in the form of analog signals of RGB, and then outputs the read RGB signals to the color image processing apparatus 2. Further, the color image output apparatus 3 is image forming means employing an electrophotography method or an inkjet method for outputting the image data of the document image onto a record paper sheet. Further, the color image output apparatus 3 may be a display unit such as a display.

The color image processing apparatus 2 is constructed from a CPU, an ASIC (Application Specific Integrated Circuit), and the like.

An A/D conversion section 20 converts the RGB signals inputted from the color image input apparatus 1 into, for example, 10-bit digital signals, and then outputs the converted RGB signals to a shading correction section 21.

The shading correction section 21 performs correction processing in which various kinds of distortion generated in the illumination system, the image focusing system, and the image sensing system of the color image input apparatus 1 is removed from the inputted RGB signals. Further, the shading correction section 21 performs the processing of adjusting the color balance on the inputted RGB signals (RGB reflectivity signals) and performs the processing of converting the signals into those such as a density signal easily treated by the image processing system adopted in the color image processing apparatus 2, and then outputs the converted RGB signals (image) to a document matching process section 22.

The document matching process section 22 binarizes the inputted image (image data), then calculates feature points (e.g., the centroid) of a connected region specified on the basis of the binary image, then selects a plurality of feature points from among the calculated feature points, then obtains an invariant on the basis of the selected feature points, and then calculates a features (e.g., a hash value) on the basis of the invariant. Then, on the basis of the calculated features, the document matching process section 22 determines whether the inputted image (document image) is similar to a stored format (stored image) stored preliminary. When it is determined as being similar, the document matching process section 22 determines whether entry omission (erroneous omission) is present in the input image (document image), and then outputs a determination signal (a determination result indicating the presence or absence of entry omission). Further, the document matching process section 22 outputs the inputted RGB signals intact to an input tone correction section 23 of the subsequent stage.

The input tone correction section 23 performs image quality adjustment processing such as the page background density removing or contrast, and then outputs the processed RGB signals to a segmentation process section 24.

On the basis of the inputted RGB signals, the segmentation process section 24 separates individual pixels of the inputted image into a character region (text region), a halftone region, and a photograph region. On the basis of the separation result, the segmentation process section 24 outputs a segmentation class signal indicating that each pixel belongs to which region, to a black generation and under color removal section 26, a spatial filter process section 27 and a tone reproduction process section 29. Further, the segmentation process section 24 outputs the inputted RGB signals intact to a color correction section 25 of the subsequent stage.

The color correction section 25 converts the inputted RGB signals into the color space of CMY, then performs color correction in accordance with the characteristics of the color image output apparatus 3, and then outputs the corrected CMY signals to the black generation and under color removal section 26. Specifically, for the purpose of high fidelity in color reproduction, the color correction section 25 performs the processing of removing color inaccuracy on the basis of the spectral characteristics of the CMY color materials containing unnecessary absorption components.

On the basis of the CMY signals inputted from the color correction section 25, the black generation and under color removal section 26 generates a K (black) signal and, at the same time, subtracts the K signal from the inputted CMY signals so as to generate new CMY signals, and then outputs the generated CMYK signals to the spatial filter process section 27.

An example of processing in the black generation and under color removal section 26 is described below. For example, in the case of processing of black generation by using skeleton black, the input-output characteristics of the skeleton curve is expressed by $y=f(x)$, inputted data is denoted by C, M, and Y, outputted data is denoted by C', M', Y', and K', and the UCR (Under Color Removal) ratio is denoted by $\alpha$ ($0<\alpha<1$). Then, data outputted in the black generation and the page background removing processing is expressed by $K'=f\{\min(C,M,Y)\}$, $C'=C-\alpha K'$, $M'=M-\alpha K'$, and $Y'=Y-\alpha K'$.

The spatial filter process section 27 performs spatial filtering by means of a digital filter based on the segmentation class signal, onto the CMYK signals inputted from the black generation and under color removal section 26. By virtue of this, the spatial frequency characteristics of the image data is corrected so that blur occurrence or graininess degradation is avoided in the output image in the color image output apparatus 3. For example, in order to improve the reproducibility of, especially, black characters or color characters, the spatial filter process section 27 performs edge enhancement processing so as to emphasize high frequency components for the region separated into a character region by the segmentation process section 24. Further, the spatial filter process section 27 performs low pass filtering for removing the input dotted components, onto the region separated into a dotted region by the segmentation process section 24. The spatial filter process section 27 outputs the processed CMYK signals to the output tone correction section 28.

The output tone correction section 28 performs output tone correction processing of converting the CMYK signals inputted from the spatial filter process section 27 into a dotted area ratio which is a characteristic value of the color image output apparatus 3. Then, the output tone correction section 28 outputs the CMYK signals having undergone the output gradation correction processing to the tone reproduction process section 29.

On the basis of the segmentation class signal inputted from the segmentation process section 24, the tone reproduction process section 29 performs predetermined processing on the CMYK signals inputted from the output tone correction section 28. For example, in order to improve the reproducibility of, especially, black characters or color characters, the tone reproduction process section 29 performs binarization processing or multi-level-dithering processing on the region separated into a character region, such that the signals should become appropriate for the reproduction of high frequency components in the color image output apparatus 3.

Further, the tone reproduction process section 29 performs gradation reproduction processing (halftone generation) on the region separated into a dotted region by the segmentation process section 24, such that the image is finally separated into pixels so that each gradation can be reproduced. Further, the tone reproduction process section 29 performs binarization processing or multi-level-dithering processing on the region separated into a photograph region by the segmentation process section 24, such that the signals should become appropriate for the gradation reproduction in the color image output apparatus 3.

The color image processing apparatus 2 temporarily stores into a storage section (not shown) the image data (CMYK signals) processed by the tone reproduction process section 29. Then, in a predetermined timing of performing image formation, the color image processing apparatus 2 reads the image data stored in the storage section, and then outputs the read image data to the color image output apparatus 3. Control for these is performed, for example, by a CPU (not shown). Further, on the basis of the determination signal outputted from the document matching process section 22, the CPU (not shown) in the color image processing apparatus 2 performs control such that predetermined processing (e.g., notification of entry omission and delivery of a document with omission) is performed on the document image.

Figure 2:
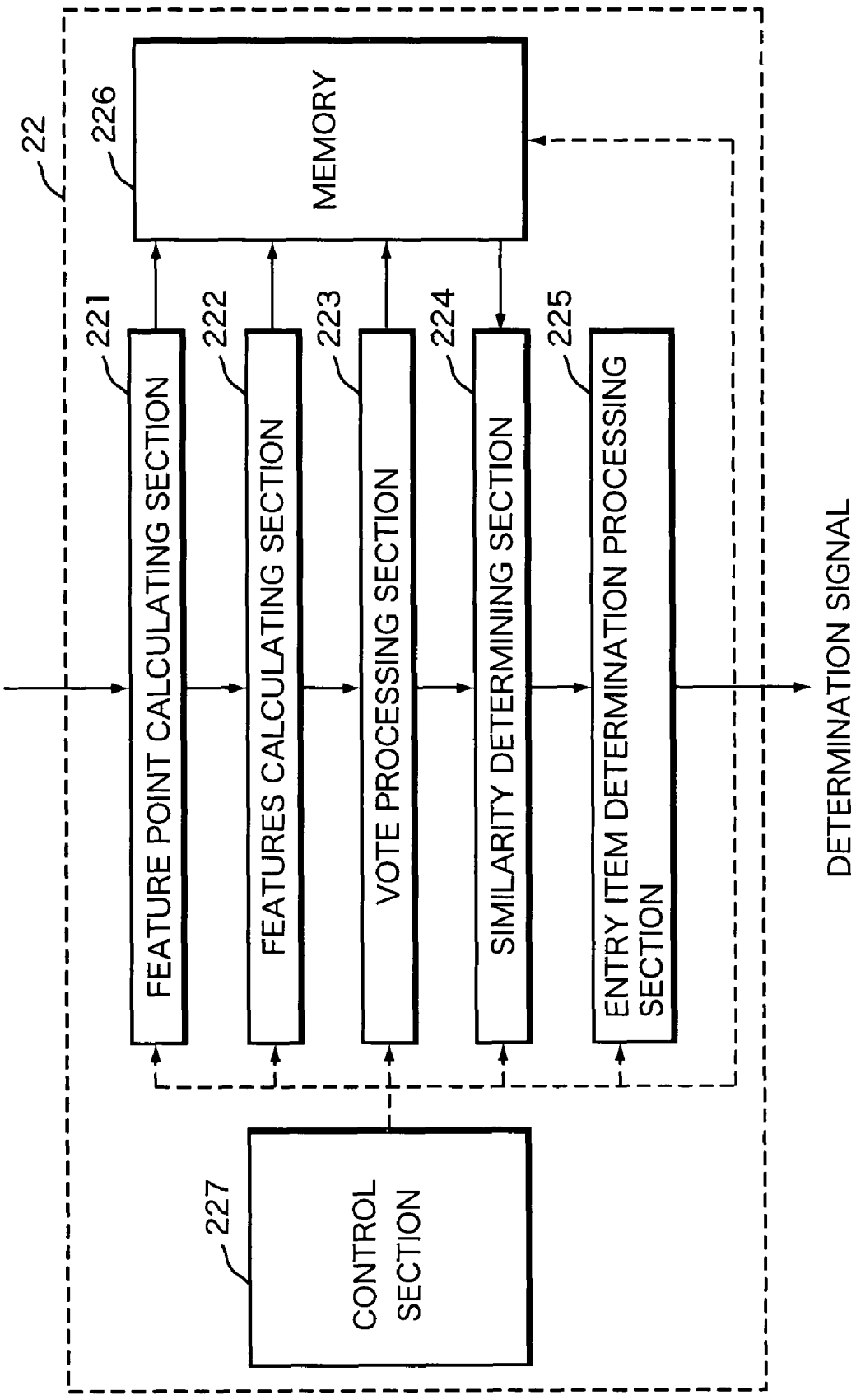
FIG. 2 is a block diagram showing a configuration of a document matching process section.

FIG. 2 is a block diagram showing the configuration of the document matching process section 22. The document matching process section 22 includes a feature point calculating section 221, a features calculating section 222, a vote processing section 223, a similarity determination processing section 224, an entry item determination processing section 225, a memory 226, and a control section 227 for controlling these sections.

The feature point calculating section 221 performs later-described predetermined processing on the inputted image data (document image) and, at the same time, extracts a connected region of character strings or ruled lines in the inputted image so as to calculate a feature point (e.g., the centroid) of the connected region. More specifically, the feature point calculating section 221 binarizes the inputted image extracts (calculates) a feature point (e.g., a value obtained by accumulating the coordinate values of the individual pixels constituting a connected region in the binary image and by dividing the accumulated coordinate values with the number of pixels contained in the connected region) of the connected region specified on the basis of the binary image, and then outputs the extracted feature point to the features calculating section 222.

Figure 3:
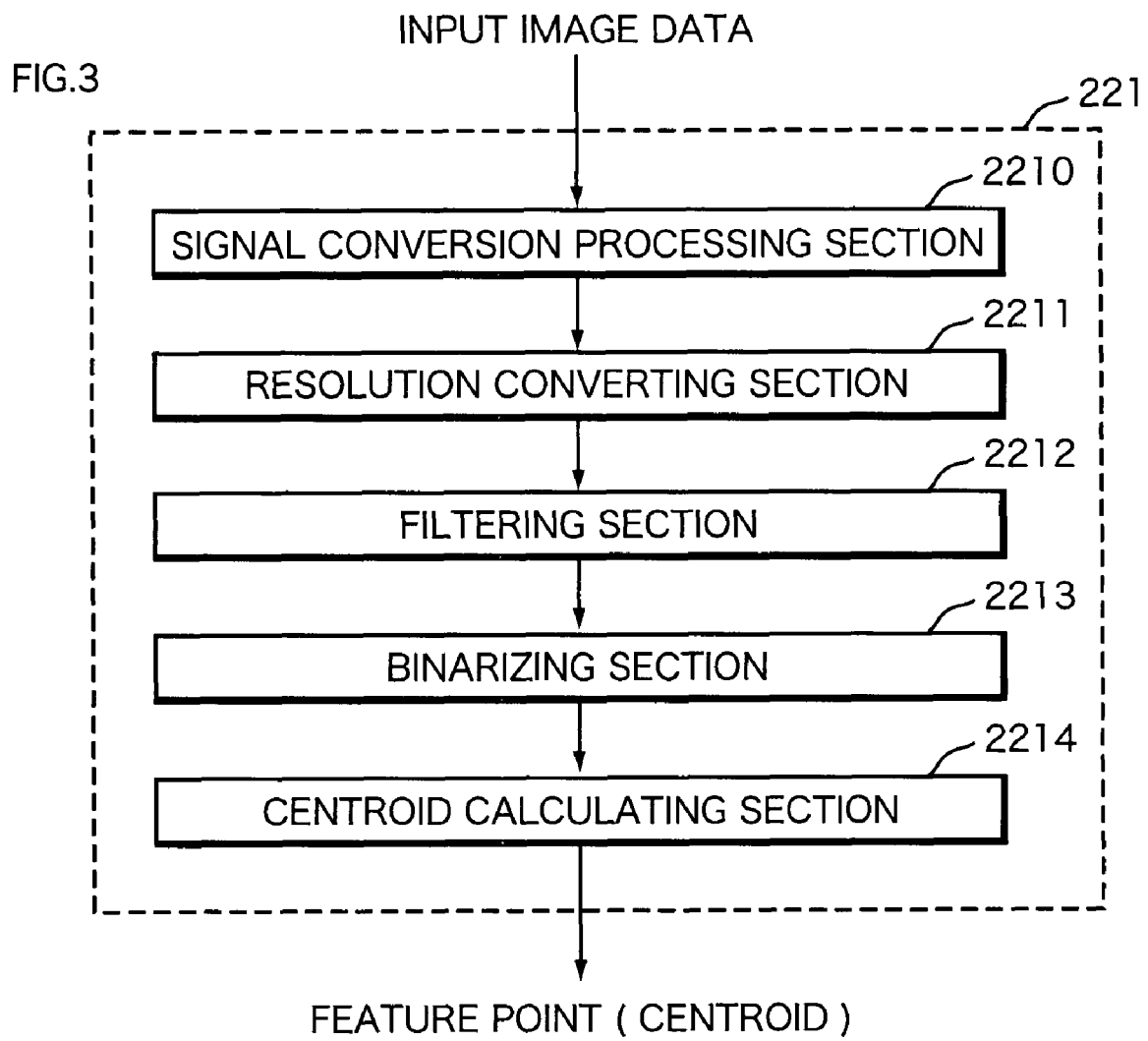
FIG. 3 is a block diagram showing a configuration of a feature point calculating section.

FIG. 3 is a block diagram showing the configuration of the feature point calculating section 221. The feature point calculating section 221 includes a signal conversion section 2210, a resolution converting section 2211, a filtering section 2212, a binarizing section 2213, and a centroid calculating section 2214.

When the inputted image (image data) is a color image, the signal conversion processing section 2210 achromatizes and converts the color image into a luminance signal or a lightness signal, and then outputs the converted image to the resolution converting section 2211. For example, when the color components RGB of each pixel is denoted respectively by Rj, Gj, and Bj, the luminance signal Yj is expressed by Yj=0.30×Rj+0.59×Gj+0.11×Bj. Here, the present invention is not limited to this formula. That is, the RGB signals may be converted into CIE1976 L*a*b* signals.

Even when the inputted image is one having undergone optical magnification change in the color image input apparatus 1, the resolution converting section 2211 performs magnification change on the inputted image again such as to realize a predetermined resolution, and then outputs to the filtering section 2212 the image having undergone the magnification change. By virtue of this, even when magnification change processing has been performed by the color image input apparatus 1 so that the resolution has varied, extraction of a feature point is achieved free from its influence. This permits accurate classification of the document. In particular, in the case of size-reduced characters, a possibility is avoided that when a connected region is to be specified by binarization processing, blotted characters cause intrinsically separated regions to be specified as if they are connected to each other so that the calculated centroid may deviate. Further, the resolution converting section 2211 converts the image into that of a resolution smaller than the resolution obtained when the image is read by the color image input apparatus 1 with unity magnification. For example, an image read at 600 dpi (dot per inch) by the color image input apparatus 1 is converted into that of 300 dpi. This reduces the amount of processing in the subsequent stage.

The filtering section 2212 corrects the spatial frequency characteristics of the inputted image (e.g., enhancement processing and smoothing of the image), and then outputs the corrected image to the binarizing section 2213. Since the spatial frequency characteristics of the color image input apparatus 1 is different depending on each model, the filtering section 2212 corrects the different spatial frequency characteristics into required characteristics. In the image (e.g., image signal) outputted from the color image input apparatus 1, degradation such as blurring in the image is caused by, for example: optical system components such as lenses and mirrors; the aperture ratio, the transfer efficiency, and the after-image of the light acceptance surface of CCD; and the storage effect and the scanning unevenness caused by the physical scan. The filtering section 2212 performs enhancement processing on the boundary or the edges so as to restores degradation such as blurring generated in the image. Further, the filtering section 2212 performs smoothing for suppressing high frequency components which are unnecessary in the feature point extracting processing performed in the subsequent stage. This permits accurate extraction of a feature point, and hence achieves accurate determination of the similarity of the image. Here, the filter coefficient used in the filtering section 2212 may be set up appropriately in accordance with the model, the characteristics, or the like of the employed color image input apparatus 1.

FIG. 4 is an explanation diagram showing an example of the filter coefficient of the filtering section 2212. As shown in the figure, the spatial filter is, for example, a mixing filter that has a size of 7×7 (seven rows by seven columns) and that performs enhancement processing and smoothing processing. The pixels of the inputted image are scanned so that arithmetic processing by the spatial filter is performed on all the pixels. Here, the size of the spatial filter is not limited to the size of 7×7. That is, the size may be 3×3, 5×5, or the like. Further, the numerical value of the filter coefficient is an example. That is, the actual value is not limited to this example, and may be set up appropriately in accordance with the model, the characteristics, or the like of the employed color image input apparatus 1.

The binarizing section 2213 compares with a threshold value the luminance value (the luminance signal) or the lightness value (the lightness signal) of the inputted image so as to binarize the image, and then outputs to the centroid calculating section 2214 the binary image having undergone the binarization.

On the basis of the binarization information (e.g., expressed by "1" and "0") of each pixel of the binary image inputted from the binarizing section 2213, the centroid calculating section 2214 performs labeling (label attaching processing) on each pixel. Then, the centroid calculating section 2214 specifies a connected region where pixels having the same label are in succession, then extracts as a feature point the centroid of the specified connected region, and then outputs the extracted feature point to the features calculating section 222. Here, the feature point is expressed by the coordinates (x',y') in the binary image (document image).

Figure 5:
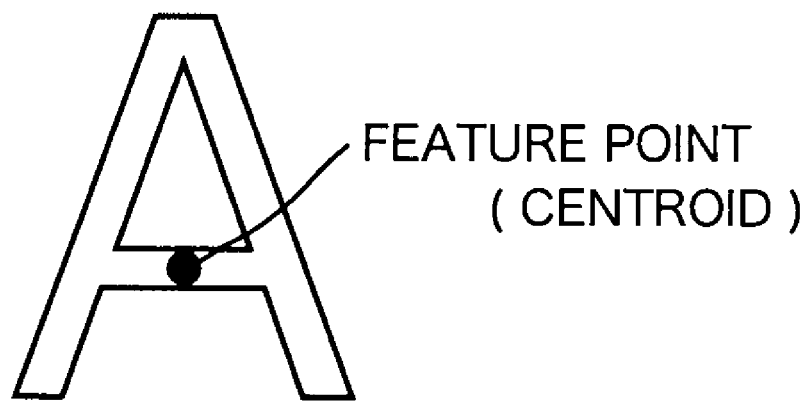
FIG. 5 is an explanation diagram showing an example of a feature point of a connected region.

FIG. 5 is an explanation diagram showing an example of a feature point of a connected region. In the figure, the specified connected region is a character "A", and is specified as a set of pixels to which the same label is imparted. A feature point (centroid) of this character "A" is located at a position (x'-coordinate,y'-coordinate) indicated by a black dot in the figure.

Figure 6:
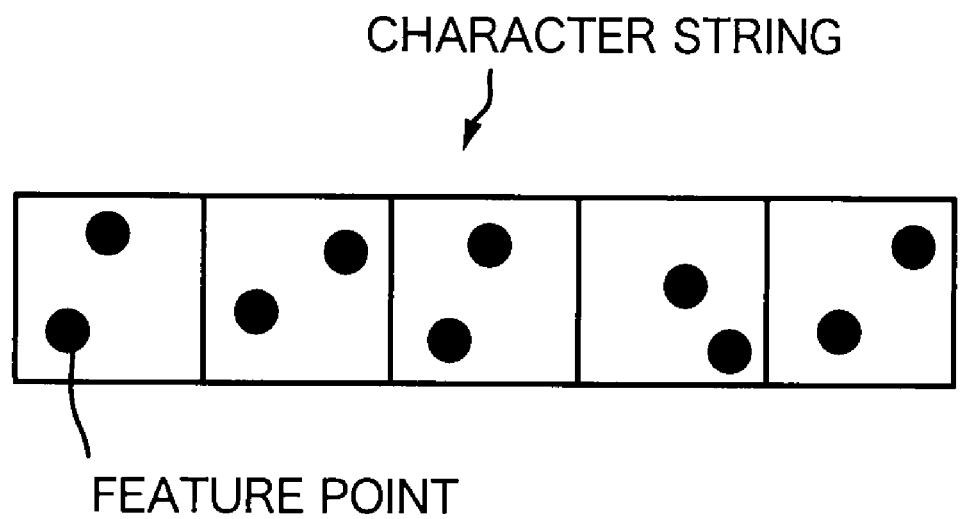
FIG. 6 is an explanation diagram showing an example of a result of extraction of a feature point for a character string.

FIG. 6 is an explanation diagram showing an example of a result of extraction of a feature point for a character string. In the case of a character string composed of a plurality of characters, a plurality of feature points are extracted that have different coordinates depending on the kinds of characters.

Using the feature point inputted from the feature point calculating section 221, the features calculating section 222 calculates an invariant with respect to the processing of rotation, expansion, size-reduction, or the like, and then calculates features (feature vector) on the basis of this invariant. More specifically, the features calculating section 222 adopts, as a current feature point, each feature point (that is, coordinate values of the centroid of the connected region) inputted from the feature point calculating section 221, and then extracts, for example, surrounding four feature points having smaller distances from the current feature point.

Figure 7:
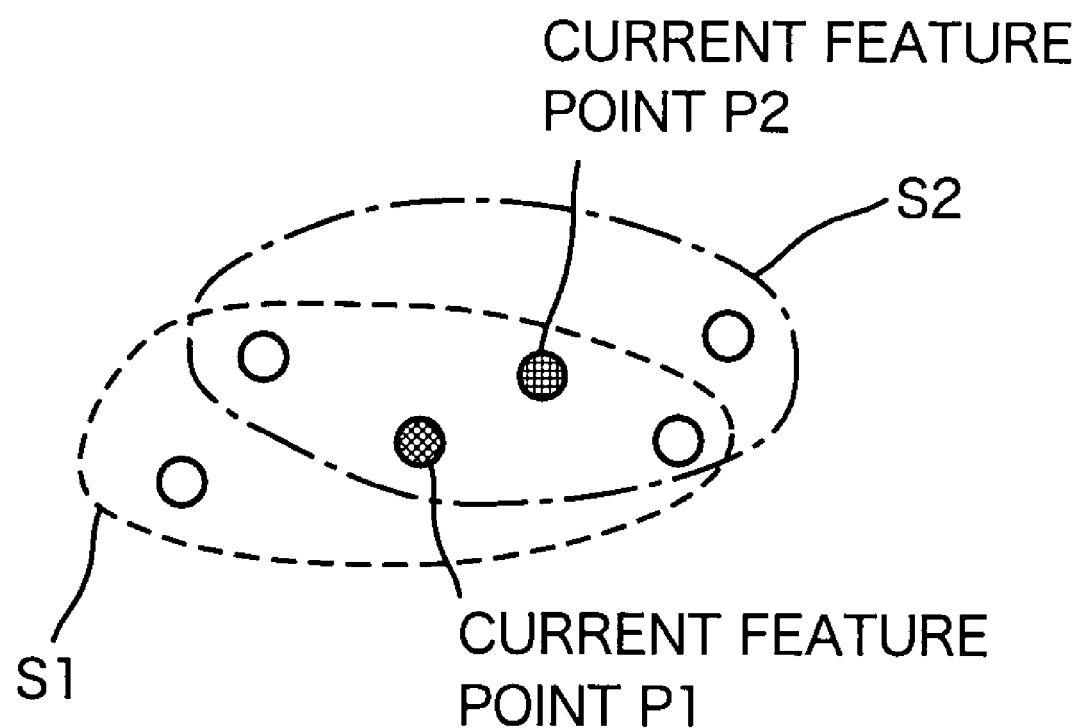
FIG. 7 is an explanation diagram showing the current feature point and the surrounding feature point.

FIG. 7 is an explanation diagram showing current feature points and surrounding feature points. As shown in the figure, as for a current feature point P1, for example, in ascending order of distance from the current feature point P1, four feature points surrounded by a closed curve S1 are extracted (for the current feature point P1, a current feature point P2 also is extracted as one feature point). Further, as for the current feature point P2, for example, similarly to the above-mentioned case, in ascending order of distance from the current feature point P2, four feature points surrounded by a closed curve S2 are extracted (for the current feature point P2, the current feature point P1 also is extracted as one feature point).

The features calculating section 222 selects three feature points from the four extracted feature points so as to calculate an invariant. Here, the number of selected feature points is not limited to three. That is, four, five, or the like feature points may be selected. The number of feature points to be selected differs according to the kind of desired invariant. For example, an invariant calculated from three points is a similarity invariant.

Figure 8A:
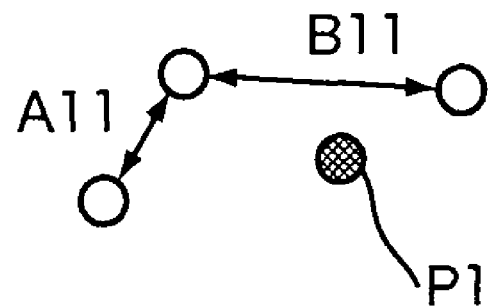
FIGS. 8A to 8C are explanation diagrams showing an example of calculation of an invariant with respect to a current feature point.
Figure 8B:
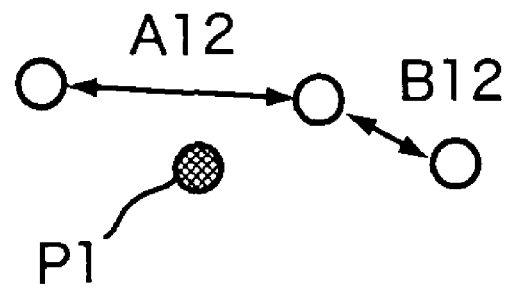
Figure 8C:
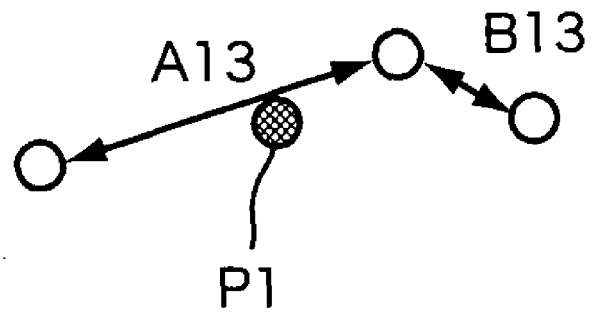
Figure 9A:
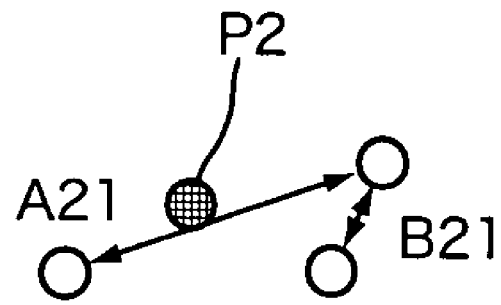
FIGS. 9A to 9C are explanation diagrams showing an example of calculation of an invariant with respect to a current feature point.
Figure 9B:
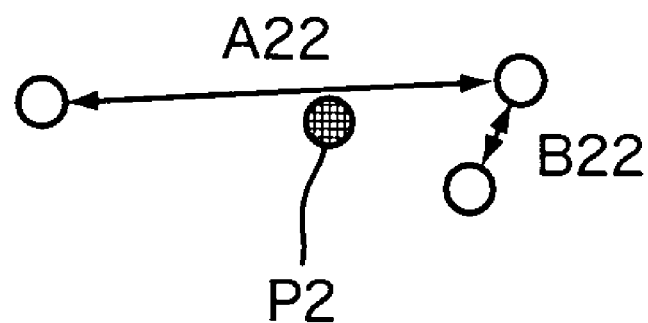
Figure 9C:
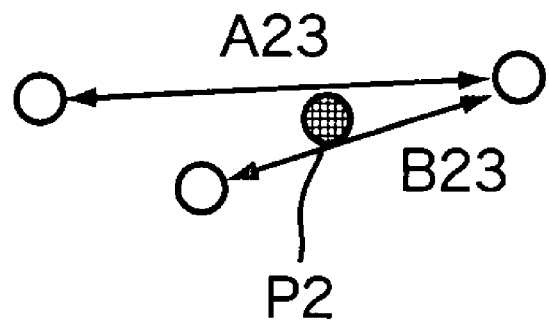
Figure 11B:
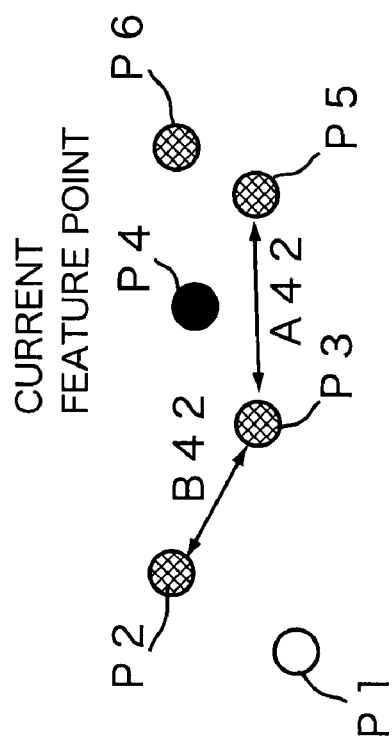
FIGS. 11A to 11D are explanation diagrams showing another example of calculation of an invariant with respect to a current feature point.
Figure 11D:
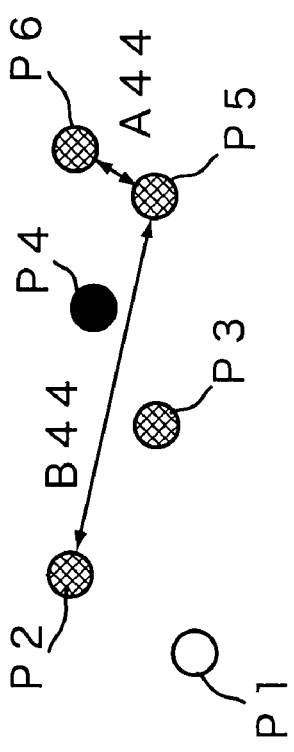
Figure 11A:
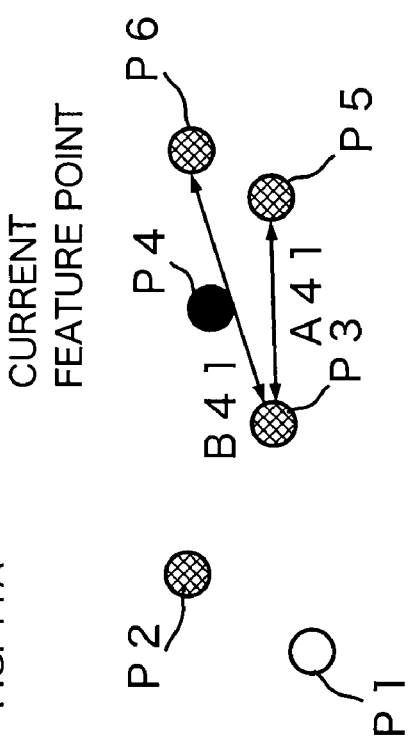
Figure 11C:
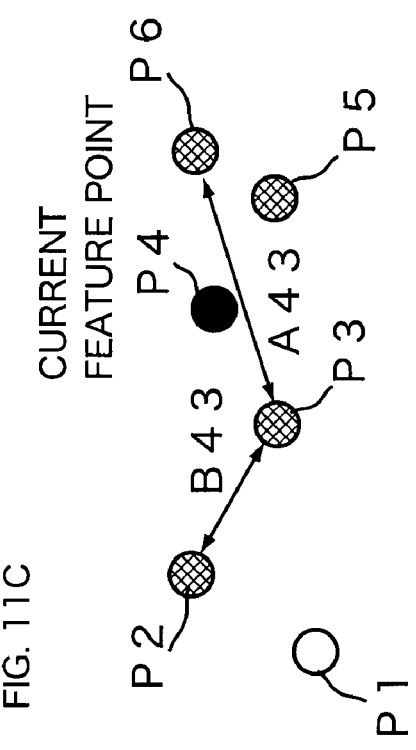

FIGS. 8A to 8C are explanation diagrams showing examples of calculation of an invariant with respect to a current feature point P1. FIGS. 9A to 9C are explanation diagrams showing examples of calculation of an invariant with respect to a current feature point P2. As shown in FIGS. 8A to 8C, three feature points are selected from the four feature points surrounding the current feature point P1. Then, three kinds of invariants are denoted respectively by H1$j$ ($j$=1, 2, 3). Each invariant H1$j$ is calculated by a formula expressed by H1$j$=A1$j$/B1$j$. Here, each of A1$j$ and B1$j$ indicates the distance between the feature points. The distance between feature points is calculated on the basis of the coordinate values of the individual surrounding feature points. Thus, for example, even when the document is rotated, moved, or inclined, the invariant H1$j$ does not vary. Accordingly, determination of the similarity of the image is achieved with satisfactory accuracy, and hence a similar document can be determined with satisfactory accuracy.

Similarly, as shown in FIGS. 9A to 9C, three feature points are selected from the four feature points surrounding the current feature point P2. Then, three kinds of invariants are denoted respectively by H2$j$ ($j$=1, 2, 3). Each invariant H2$j$ is calculated by a formula expressed by H2$j$=A2$j$/B2$j$. Here, each of A2$j$ and B2$j$ indicates the distance between the feature points. Similarly to the above-mentioned case, the distance between feature points is calculated on the basis of the coordinate values of the individual surrounding feature points. In accordance with a similar procedure, invariants can be calculated for the other feature points.

On the basis of the invariants calculated for each current feature point, the features calculating section 222 calculates a hash value (a features) Hi. The hash value of a current feature point Pi is expressed by $Hi=(Hi1 \times 10^2 + Hi2 \times 10^1 + Hi3 \times 10^0)/E$. Here, i is a natural number and denotes the identification number of a feature point. Further, E is a constant determined by how large remainder is expected. For example, when the value is set to be "10", the remainder falls between "0" and "9". This gives the range that can be taken by the calculated hash value. Further, i is a natural number and denotes the identification number of a feature point.

FIGS. 10A to 10D are explanation diagrams showing other examples of calculation of an invariant with respect to a current feature point P3. FIGS. 11A to 11D are explanation diagrams showing other examples of calculation of an invariant with respect to a current feature point P4. As shown in FIGS. 10A to 10D, four kinds of combinations may be selected from the four points consisting of the surrounding feature points P1, P2, P4, and P5 of the current feature point P3. Then, similarly to the above-mentioned case, invariants H3$j$ ($j$=1, 2, 3, 4) may be calculated by H3$j$=A3$j$/B3$j$.

Further, as shown in FIGS. 11A to 11D, four kinds of combinations may be selected from the four points consisting of the surrounding feature points P2, P3, P5, and P6 of the current feature point P4. Then, similarly to the above-mentioned case, invariants H4$j$ ($j$=1, 2, 3, 4) may be calculated by H4$j$=A4$j$/B4$j$. In the examples of FIGS. 10A to 10D and FIGS. 11A to 11D, the hash value Hi of a current feature point Pi is calculated by $$Hi=(Hi1 \times 10^3 + Hi2 \times 10^2 + Hi3 \times 10^1 + Hi4 \times 10^0)/E.$$

Here, the above-mentioned hash value serving as features is an example, and is not limited to this. Another hash function may be employed. The above-mentioned example has been described for the case that four points are extracted as other surrounding feature points. However, the number of points is not limited to four. For example, six points may be extracted. In this case, five points may be extracted from the six feature points. Then, for each of the six kinds of methods of extracting five points, invariants may be calculated by extracting three points from the five points, so that a hash value may be calculated. This permits that one hash value is calculated from one feature point, and also that a plurality of hash values are calculated from one feature point.

The features calculating section 222 stores: an index indicating a feature point of the document image; a hash value calculated with respect to the feature point; and the coordinates of the feature point on the document image; as a feature point coordinate table for the document image into the memory 226.

When the document image is to be stored, for example, a document registration mode is selected in the operation panel 4 of the image forming apparatus 100, so that registration is performed. Whether the document registration mode is selected is determined by the control section 227. When the document registration mode is not selected, ordinary operation of copying, filing, e-mail transmission, or the like is performed. Here, in addition to being performed by a dedicated hardware circuit such as the document matching processing section 22, the document registration processing may be performed by a method in which a computer program that defines the procedure of document registration processing is loaded onto a personal computer having a CPU, a RAM, a ROM, and the like and then the computer program is executed by the CPU.

FIG. 12 is an explanation diagram showing the structure of a feature point coordinate table 2261 for a document image. The feature point coordinate table 2261 for a document image is composed of individual fields for: an index indicating a feature point of the document image; a hash value calculated with respect to the feature point; and the coordinates (x'-coordinate, y'-coordinate) of a feature point on the document image.

As shown in FIG. 12, for example, the hash value calculated with respect to the feature point in which the index indicating a feature point of the document image is p1 is H1. The coordinates of the feature point are (x11',y11'). Further, similarly, the hash value calculated with respect to the feature point in which the index indicating a feature point of the document image is p2 is H8. The coordinates of the feature point are (x32',y32').

FIGS. 13A and 13B are explanation diagrams showing the structure of a hash table 2262 for stored formats. As shown in FIG. 13A, The structure of the hash table 2262 includes individual fields of a hash value and an index that indicates a document (a stored format). More specifically, in correspondence to an index that indicates a document, a point index that indicates a position in the document and an invariant (both are not shown) are stored. The hash table 2262 is stored in the memory 226. Further, for the purpose of determination of the similarity of an image, stored formats (images to be collated and document images) are stored in the memory 226. Here, as shown in FIG. 13B, when hash values are equal to each other (H1=H5), the two entries in the hash table 2262 may be unified.

FIG. 14 is an explanation diagram showing the structure of a feature point coordinate table 2263 for stored formats. The feature point coordinate table 2263 for stored formats is stored in the memory 226, and composed of individual fields of: an index indicating a document for specifying each stored format; an index indicating a feature point for specifying the feature point calculated in each stored format; and the coordinates (x-coordinate, y-coordinate) of each feature point on the stored format.

As shown in FIG. 14, for example, the stored format having the index ID1 indicating the document has feature points f11, f12, f13, f14, . . . . The coordinates of the individual feature points on the stored format are (x11,y11), (x12,y12), (x13, y13), (x14,y14) . . . . The situation is similar to the other stored formats ID2, . . . .

On the basis of the hash value (features) calculated by the features calculating section 222, the vote processing section 223 searches the hash table 2262 for stored formats stored in the memory 226. When the hash value agrees, the vote processing section 223 votes for the index indicating the document stored at the hash value (that is, the image in which the same hash value has been calculated). The result obtained by accumulating the votes is outputted as the number of obtained votes to the similarity determination processing section 224.

Further, when the hash value of the document image and the hash value of the stored format agree with each other, the vote processing section 223 determines which feature point in which stored format has been voted by the feature point of the document image, and then stores the determination result as a feature point vote table 2264 in the memory 226.

FIG. 15 is an explanation diagram showing the structure of the feature point vote table 2264. In the feature point vote table 2264, indices p1, p2, . . . each indicating a feature point of a document image are recorded in each element of a matrix composed of: indices f11, f21, . . . , fn1 (denoted by "fn1", hereinafter) each indicating a feature point of a stored format corresponding to indices ID1, ID2, ID3, ID4, . . . , IDn each indicating the document of a stored format; f12, f22, . . . , fn2 (denoted by "fn2", hereinafter); and similarly, fn3, fn4, fn5, fn6, fn7, . . . .

As shown in FIG. 15, for example, it is determined that the hash value calculated for the feature point of the document image expressed by the index p1 agrees with the hash value of the feature point f11 having the index ID1 indicating the document of the stored format. Further, for example, it is determined that the hash value calculated for the feature point of the document image expressed by the index p2 agrees with the hash value of the feature point f32 having the index ID3 indicating the document of the stored format. Furthermore, for example, it is determined that the hash value calculated for the feature point of the document image expressed by the index p3 agrees with the hash value of the feature point f13 having the index ID1 indicating the document of the stored format. The situation is similar to the subsequent indices p4, p5, p6, p7 . . . .

On the basis of the voting result inputted from the vote processing section 223, the similarity determination processing section 224 determines whether the read document image is similar to any stored format, and then outputs the determination result to the entry item determination processing section 225. More specifically, the similarity determination processing section 224 divides the number of obtained votes inputted from the vote processing section 223 by the greatest number of obtained votes of the document image (expressed by the number of feature points×the number of hash values calculated from one feature point), so as to calculates a normalized similarity. Then, the similarity determination processing section 224 compares the calculated similarity with a threshold value Th (e.g., 0.8) determined in advance. When the similarity is greater than or equal to the threshold value Th, the similarity determination processing section 224 determines that the document image is similar to the stored format in which the similarity has been calculated. When the similarity is smaller than the threshold value Th, the similarity determination processing section 224 concludes the absence of a stored format similar to the document image, and then outputs the determination result to the entry item determination processing section 225. Here, the number of obtained votes inputted from the vote processing section 223 may be compared with a threshold value defined in advance. Then, when the number of obtained votes is greater than or equal to the threshold value, it may be determined that the document image is similar to a stored format stored in advance, and further it may be determined that a stored format having the greatest number of obtained votes among the stored formats determined as being similar is identical to the document image.

Figure 16:
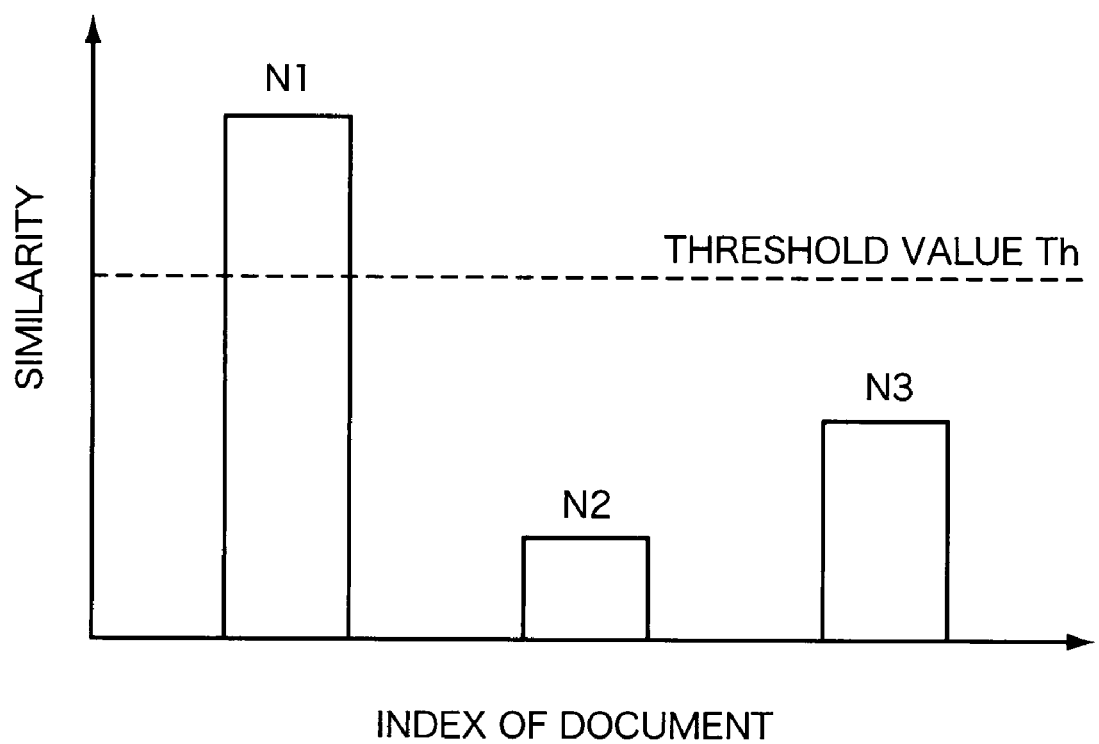
FIG. 16 is an explanation diagram showing an example of similarity determination based on a voting result.

FIG. 16 is an explanation diagram showing an example of similarity determination based on a voting result. As shown in FIG. 16, the hash table 2262 is searched and vote is performed for each hash value calculated from the read document image. Then, it is assumed that as a result, vote has been performed for the stored formats in which the indices indicating the documents are ID1, ID2, and ID3. Then, each number of obtained votes obtained as a result of the voting is divided by the greatest number of obtained votes of the document image, so that normalized similarities N1, N2, and N3 are calculated. The stored format having a calculated similarity greater than or equal to the threshold value Th is that has the index ID1 indicating the document. Thus, the document image is determined as being similar to the stored format having the index ID1 indicating the document.

When the determination result that the document image is similar to the stored format is outputted from the similarity determination processing section 224, the entry item determination processing section 225 determines whether the document image has entry omission, and then outputs a determination signal that indicates the presence or absence of entry omission. More specifically, the entry item determination processing section 225 performs: position alignment processing for aligning the positions of the document image and the stored format; processing for specifying an entry omission determination region; difference processing for calculating the difference of the pixel values (e.g., luminance values) of each pixel between the document image and each stored format; determination processing for determining whether the document image has entry omission, on the basis of the calculated difference; and the like.

Next, the position alignment processing for transforming the coordinate system of the stored format into the coordinate system of the document image so as to align the positions between the images is described below. Here, in the following description, it is assumed that the document image has been determined as being similar to the stored format having the index ID1 indicating the document.

The entry item determination processing section 225 accesses the memory 226 and extracts from the feature point vote table 2264 a feature point of the document image having voted for the index ID1 indicating the document. In the example of FIG. 15, the indices indicating feature points of the document image are p1, p3, p4, and p7.

The entry item determination processing section 225 specifies indices f11, f13, f14, and f17 indicating the feature points of the stored format corresponding to the indices p1, p3, p4, and p7 indicating the feature points of the extracted document image (the hash values agree with each other). With reference to the feature point coordinate table 2263 for stored formats and the feature point coordinate table 2261 for the document image, the entry item determination processing section 225 calculates a matrix Jin concerning the coordinates of the feature points of the stored format expressed by Formula (1) and a matrix Jout concerning the coordinates of the feature points of the document image expressed by Formula (2). The transformation coefficients in a transformation matrix W are assumed to be Formula (3).

$$Jin = \begin{pmatrix} x11 & y11 & 1 \\ x13 & y13 & 1 \\ x14 & y14 & 1 \\ x17 & y17 & 1 \end{pmatrix} \quad (1)$$

$$Jout = \begin{pmatrix} x11' & y11' & 1 \\ x13' & y13' & 1 \\ x14' & y14' & 1 \\ x17' & y17' & 1 \end{pmatrix} \quad (2)$$

$$W = \begin{pmatrix} a & b & c \\ d & e & f \\ g & h & i \end{pmatrix} \quad (3)$$

The entry item determination processing section 225 calculates the transformation matrix W in accordance with Formula (4). In this case, the transposed matrix $Jin^T$ of Jin is multiplied to both sides of Formula (4), so that Formula (5) is obtained. Further, the inverse matrix of $Jin^T$ Jin is multiplied to both sides of Formula (5), so that Formula (6) is obtained. As a result, the transformation coefficients are calculated. Using the transformation matrix W expressed by the calculated transformation coefficients, the entry item determination processing section 225 transforms arbitrary coordinates (x,y) on the stored format into coordinates (x',y') on the document image as shown by Formula (7).

$$Jout = Jin \times W \quad (4)$$

$$Jin^T Jout = Jin^T Jin \times W \quad (5)$$

$$(Jin^T Jin)^{-1} Jin^T Jout = W \quad (6)$$

$$(x', y', 1) = (x, y, 1) \times A \quad (7)$$

Figure 17:
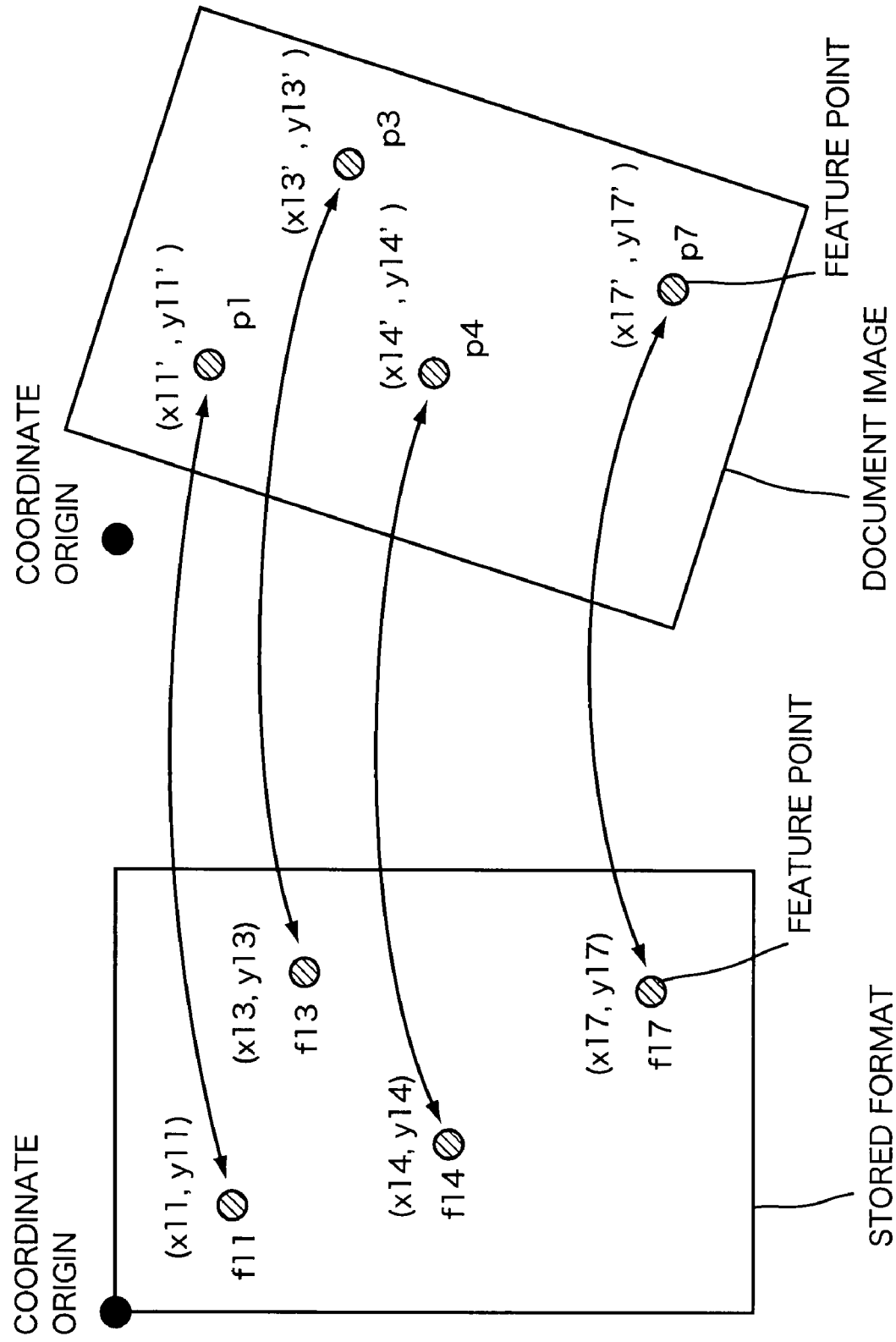
FIG. 17 is an explanation diagram showing position alignment between a document image and a stored format.

FIG. 17 is an explanation diagram showing position alignment between the document image and the stored format. As shown in FIG. 17, when correspondence is established respectively between the feature points f11, f13, f14, and f17 of the stored format and the feature points p1, p3, p4, and p7 of the document image, even in a case that the positions of the origin (the pixel at the upper left of the image) of the stored format and the pixel at the upper left of the document image deviate from each other, the origins of the two images can be made to agree with each other, so that position alignment is achieved between the stored format and the document image. Here, the number of feature points of each image is not limited to four. Further, depending on the format of a stored format, in a case that a large number of feature points are present, several feature points may be selected from among them.

Figure 18:
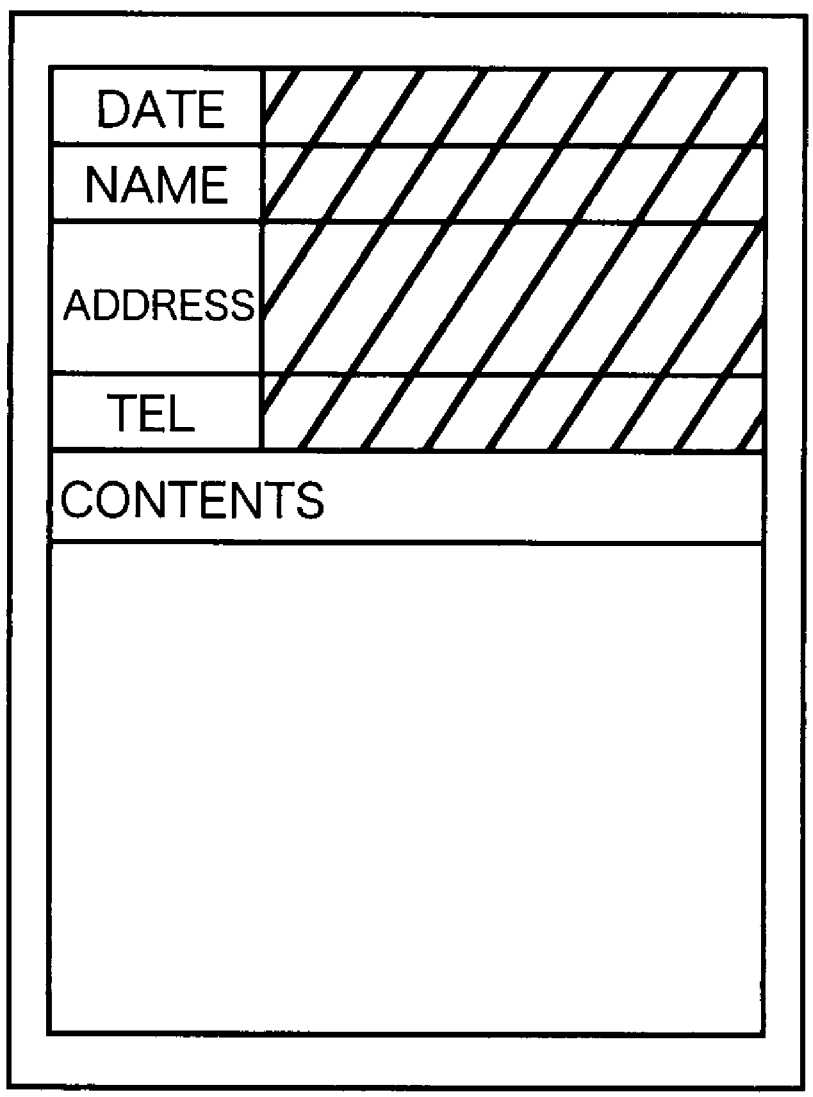
FIG. 18 is an explanation diagram showing an example of a stored format.

Next, the specification of a determination region (a determination part) where the presence or absence of entry omission is to be determined. FIG. 18 is an explanation diagram showing an example of a stored format. As shown in FIG. 18, in the stored format (that is, a document having a predetermined format) serving as an example, entry fields are provided that correspond to individual item names consisting of date, name, address, telephone number, and contents. Further, as for parts where entry omission is to be determined among the entry fields, entry fields (regions with marking in the figure) are defined in advance in correspondence to the individual item names consisting of date, name, address, and telephone number.

Figures 19A, 19B:
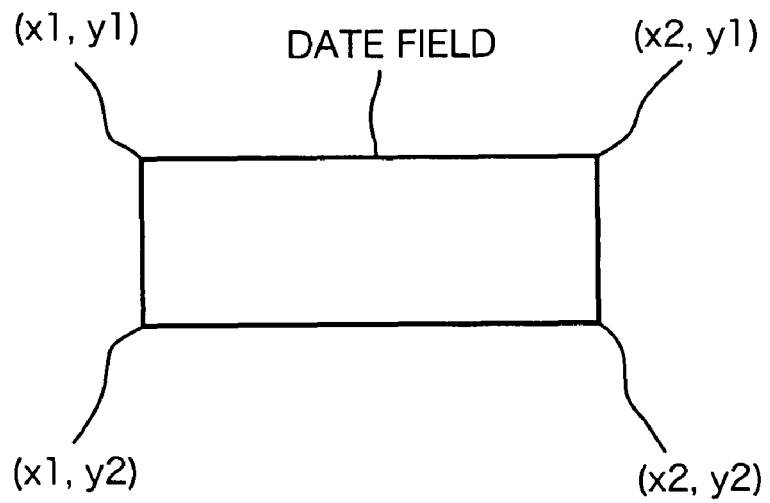
FIGS. 19A and 19B are explanation diagrams showing an example of a determination area table indicating entry omission determination regions.

FIGS. 19A and 19B are explanation diagrams showing an example of the determination area table 2265 indicating the entry omission determination regions. As shown in FIG. 19A, the determination area table 2265 is composed of the index indicating the document of a stored format; the item name of a stored format; and the diagonal coordinates of the entry field corresponding to the item name. Further, as shown in FIG. 19B, the position of the entry field corresponding to each item name on the stored format is specified by the coordinates of the four corners of the entry field. In FIG. 19B, the coordinates (x1,y1), (x2,y1), (x1,y2), and (x2,y2) of the date field are shown as an example among the entry fields of the stored format having the index ID1 indicating the document.

As shown in FIG. 19A, for example, in the stored format having the index ID1 indicating the document, the entry field of date is specified by the coordinates (x1,y1) and (x2,y2) which are the diagonal coordinates of the entry field. Similarly, the entry field of name is specified by the coordinates (x3,y3) and (x4,y4), while the entry field of address is specified by the coordinates (x5,y5) and (x6,y6). Further, the entry field of telephone number is specified by the coordinates (x7,y7) and (x8,y8). The situation is similar to the other stored formats (having the indices ID2, ID3, . . . indicating the documents).

Figure 20:
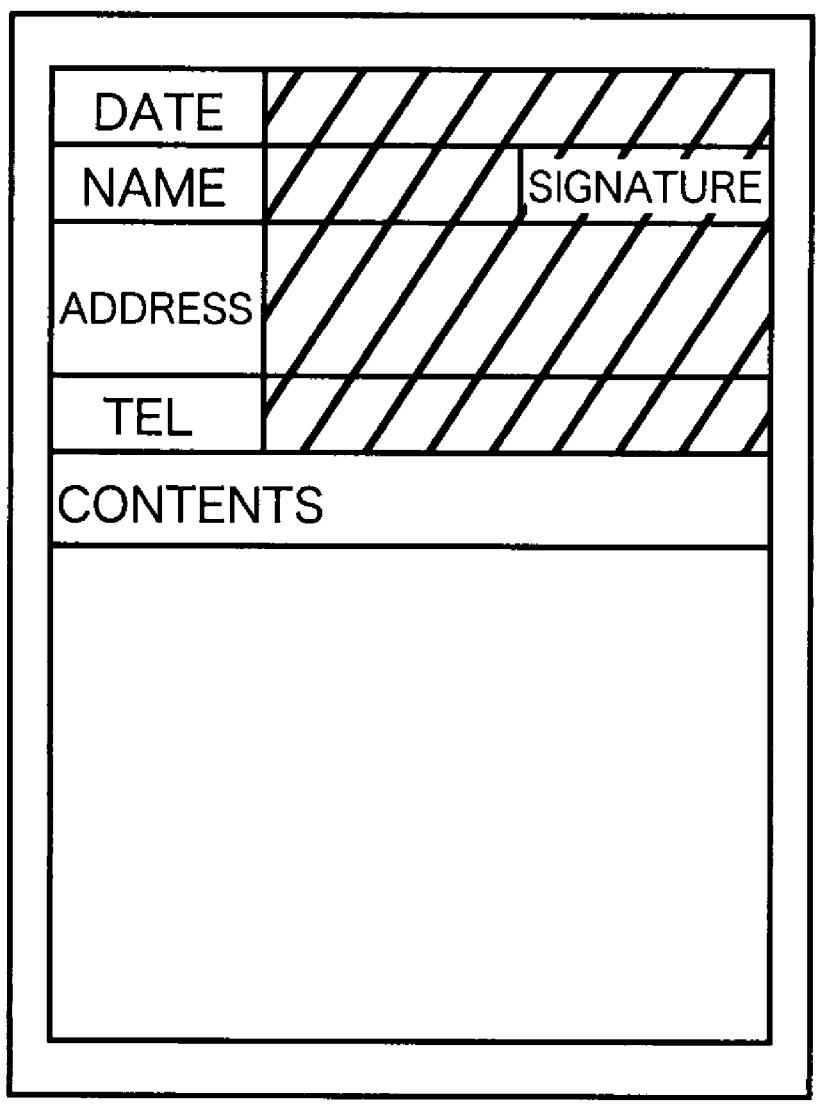
FIG. 20 is an explanation diagram showing another example of a stored format.

FIG. 20 is an explanation diagram showing another example of a stored format. FIG. 21 is an explanation diagram showing another example of the determination area table 2265 indicating the entry omission determination regions. As shown in FIG. 20, in the stored format, in addition to the item names of date, name, address, telephone number, and contents, an entry field corresponding to the item name of stamping is provided. Further, as for parts where entry omission is to be determined among the entry fields, entry fields (regions with marking in the figure) are defined in advance in correspondence to the individual item names consisting of date, name, address, telephone number, and stamping.

As shown in FIG. 21, for example, in the stored format having the index ID1 indicating the document, the entry field of date is specified by the coordinates (x1,y1) and (x2,y2) which are the diagonal coordinates of the entry field. Similarly, the entry field of name is specified by the coordinates (x3,y3) and (x4,y4), while the entry field of stamping is specified by the coordinates (x0,y0) and (x9,y9). Further, the entry field of address is specified by the coordinates (x5,y5) and (x6,y6), while the entry field of telephone number is specified by the coordinates (x7,y7) and (x8,y8).

When the document image is determined as being similar to a stored format, on the basis of the index indicating the document of the stored format determined as being similar, the entry item determination processing section 225 searches the determination area table 2265, and obtains the item names and the coordinate values of the stored format being similar. Then, on the basis of the obtained coordinate values, the entry item determination processing section 225 specifies an entry omission determination region for each item name, and then determines entry omission in the regions of the document image corresponding to the specified determination regions.

Next, the difference processing for calculating the difference of the pixel values of each pixel between the document image and the stored format is described below. The entry item determination processing section 225 scans the pixels in each determination region between the document image and the stored format having undergone position alignment, sequentially, for example, from the upper left to the lower right of the two images, and thereby calculates the difference of the luminance values of corresponding current pixels in the two images. In this case, with taking into consideration the reproducibility or the like of the pixel value at the time of reading the document, in a case that the image is expressed in 256 gradation levels, when the difference of the luminance values of corresponding pixels in the two images falls within a range of 5 to 10 (a difference threshold value Tg), the current pixels is determined as being the same. For example, when the luminance value of a particular current pixel in the document image is 210 while the luminance value of the corresponding current pixel in the stored format is 215, it is determined that the two current pixels are the same. Further, for example, when the luminance value of a particular current pixel in the document image is 210 while the luminance value of the corresponding current pixel in the stored format is 235, it is determined that the two current pixels are not the same.

The entry item determination processing section 225 determines whether the ratio obtained when the number of pixels (the number M of determined pixels) in which the pixel values (e.g., luminance values) have been determined as being approximately the same is divided by the number of pixels owned by the determination region in the stored format is greater than a ratio threshold value Ts (e.g., 0.99). When the calculated ratio is greater than the ratio threshold value Ts, the entry item determination processing section 225 determines that the document image has entry omission, and then outputs a determination signal. Further, when the calculated ratio is smaller than or equal to the ratio threshold value Ts, the entry item determination processing section 225 determines that entry omission is absent in the document image, and then outputs a determination signal. Here, it may be determined whether the ratio obtained when the number of pixels in which the pixel values have been determined as not being approximately the same is divided by the number of pixels owned by the stored format is smaller than a ratio threshold value Td (e.g., 0.01). Then, when the calculated ratio is smaller than the ratio threshold value Td, the document image may be determined as having entry omission. In contrast, when the calculated ratio is greater than or equal to the ratio threshold value Td, the document image may be determined as having no entry omission.

That is, in the entry item determination processing, in the determination regions (determination parts), the differences of the pixel values owned by the obtained document image and the stored format (stored image) are calculated. Then, the calculated difference values are compared with a predetermined threshold value (difference threshold value), so that the number of pixels (the number of determined pixels) having approximately the same pixel value is calculated. Then, a ratio is calculated that is obtained when the calculated number of determined pixels is divided by the total number of pixels owned by the determination region in the stored format. Then, the calculated ratio is compared with a predetermined threshold value (ratio threshold value) (larger or smaller comparison). Then, the presence or absence of entry omission is determined in accordance with the comparison result.

In the processing that the coordinate system of the stored format is transformed into the coordinate system of the document image so that position alignment is performed between the images, the entire stored format may be transformed as described above. Alternatively, a part where coordinate transformation is to be performed may be defined in advance for each entry field of the stored format. Then, coordinate transformation may be performed only on the part having been defined so. In this case, the part where coordinate transformation is to be performed may be set identical to the determination region where entry omission is to be determined. This allows the entry omission determination processing to be performed in a state that coordinate transformation has been performed only on the part where the presence or absence of entry omission is to be determined. Accordingly, in comparison with the case that the entire image is processed, processing work effort is reduced, and hence the entry item determination processing is performed at a high speed.

Figure 22:
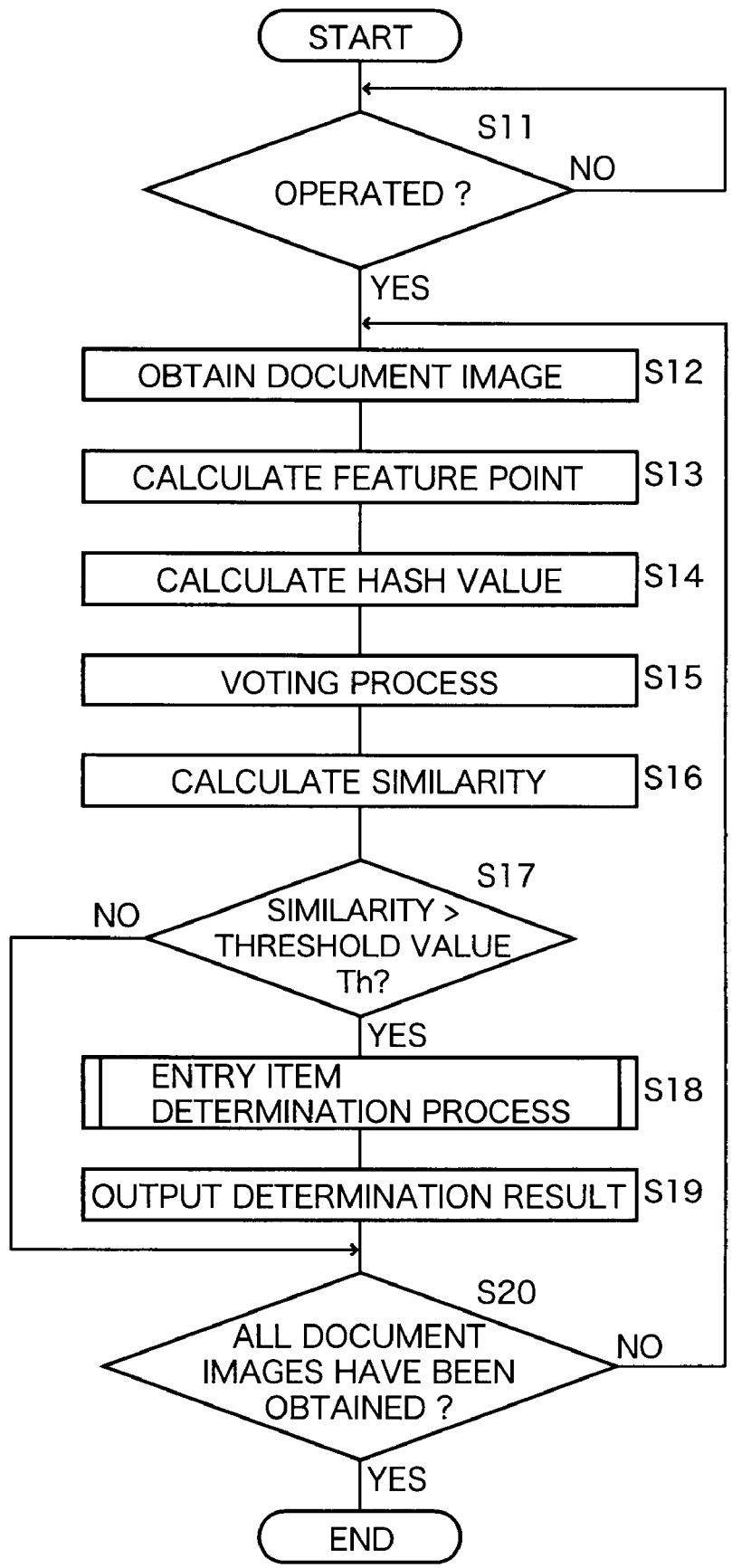
FIG. 22 is a flow chart showing a procedure of document matching process.

Next, the operation of the image forming apparatus 100 is described below. FIG. 22 is a flow chart showing the procedure of document matching process. Here, in place of implementation by a dedicated hardware circuit, the document matching process may be performed by loading a computer program that defines the procedure of document matching process onto a personal computer provided with a CPU, a RAM, a ROM, and the like and then causing the CPU to execute the computer program. Further, in addition to the document matching process, the computer program may includes the control processing for controlling: notification of the determination result in accordance with a result determined in the document matching process; delivery of a document; and the like.

The control section 227 determines the presence or absence of operation from a user (document reading operation) (S11). In the case of absence of operation (NO at S11), the processing of step S11 is continued, and hence operation from a user is awaited. In the case of presence of operation from a user (YES at S11), the control section 227 obtains a document image obtained by document read in the color image input apparatus 1 (S12).

The control section 227 calculates a feature point on the basis of the obtained document image (S13), and then calculates a hash value (features) on the basis of the calculated feature point (S14). The control section 227 searches the hash table 2262 for stored formats on the basis of the calculated hash value (features), and then votes for an index indicating a document in which the hash values agree with each other (S15). In this case, the control section 227 determines which feature point in which stored format has been voted by the feature point of the document image, and then stores the determination result.

the control section 227 divides the number of obtained votes by the greatest number of obtained votes of the document image so as to calculate the similarity (S16), and then determines whether the calculated similarity is greater than the threshold value Th (S17). When the similarity is greater than the threshold value Th (YES at S17), the control section 227 performs processing entry item determination (S18). Here, details of the entry item determination processing are described later. The control section 227 outputs the determination result obtained in the entry item determination processing (S19). Here, the CPU (not shown) in the color image processing apparatus 2 performs predetermined control processing described later in accordance with the determination result.

The control section 227 determines whether all the document images have been obtained (S20). When not all the document images have been obtained (NO at S20), the control section 227 continues the processing at and after step S12. On the other hand, when the similarity is not greater than the threshold value Th (NO at S17), the control section 227 continues the processing at and after step S20. When all the document images have been obtained (YES at S20), the control section 227 terminates the processing.

Figure 23:
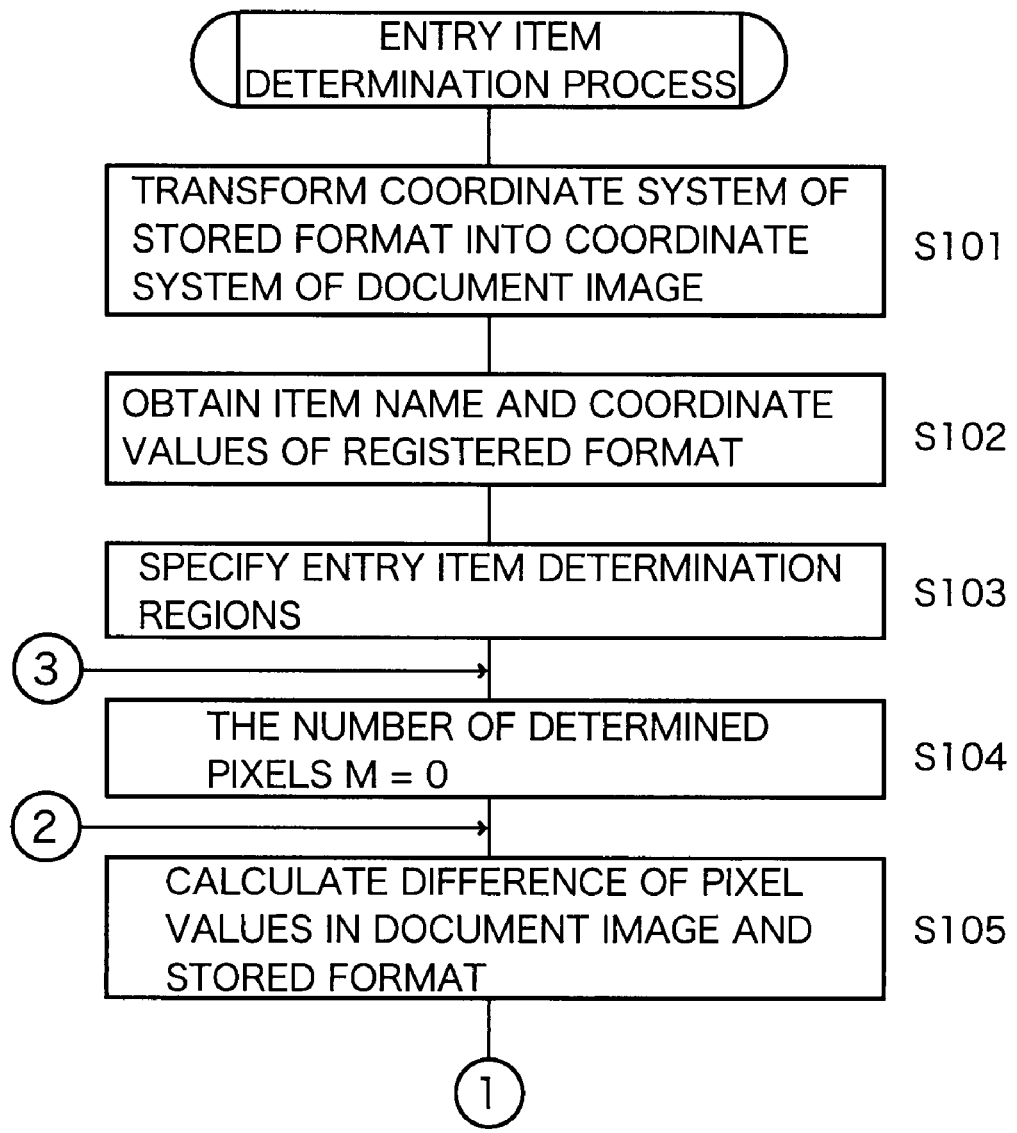
FIG. 23 is a flow chart showing a procedure of entry item determination processing.
Figure 24:
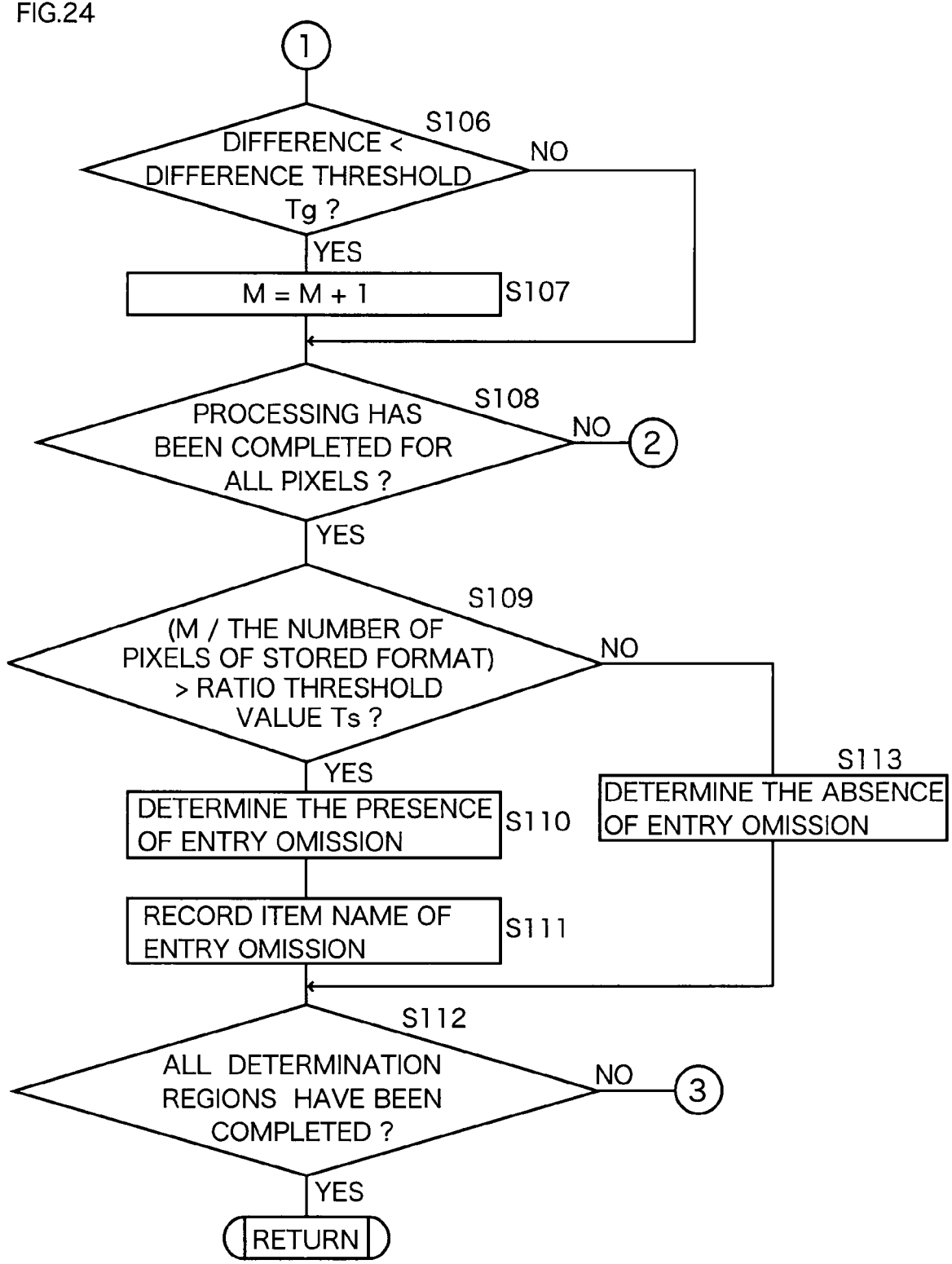
FIG. 24 is a flow chart showing a procedure of entry item determination processing.

FIGS. 23 and 24 are flow charts showing a procedure of entry item determination processing. The control section 227 transforms the coordinate system (coordinate values) of a stored format determined as being similar to the document image into the coordinate system (coordinate values) of the document image (S101). In this case, coordinate transformation may be performed on the entire stored format. Alternatively, coordinate transformation may be performed only on entry fields determined in advance in the stored format.

The control section 227 searches the determination area table 2265 and thereby obtains the item names and the coordinate values of the individual item names of the stored format determined as being similar to the document image (S102). Then, on the basis of the obtained coordinate values, the control section 227 specifies, on the document image and the stored format, entry item determination regions where entry omission is to be specified (S103).

The control section 227 sets into "0" the number M of determined pixels that indicates the number of pixels having the same pixel value (e.g., luminance value) among individual pixels between the document image and the stored format (S104), and then scans the current pixels in the document image and the stored format in the entry item determination regions, so as to calculate the difference of the pixel values for each current pixel (S105).

The control section 227 determines whether the calculated difference is smaller than the difference threshold value Tg (S106). When the difference is smaller than the difference threshold value Tg (YES at S106), the control section 227 adds "1" to the number M of determined pixels (S107). The control section 227 determines whether the processing has been completed for all the pixels of the entry item determination regions in the document image and the stored format (S108). When processing for all the pixels is not yet completed (NO at S108), the control section 227 continues the processing at and after step S105.

When the difference is not smaller than the difference threshold value Tg (NO at S106), the control section 227 continues the processing at and after step S108. When the processing has been completed for all the pixels (YES at S108), the control section 227 determines whether the ratio expressed by (the number M of determined pixels/the number of pixels in the stored format) is greater than the ratio threshold value Ts (S109).

When the ratio is greater than the ratio threshold value Ts (YES at S109), the control section 227 concludes the presence of entry omission (S110), then records item names of entry omission (S111), and then determines whether processing for all the determination regions has been completed (S112). On the other hand, when the ratio is not greater than the ratio threshold value Ts (NO at S109), the control section 227 concludes the absence of entry omission (S113), and then continues the processing at and after step S112.

When determining that processing for all the determination regions is not yet completed (NO at S112), the control section 227 continues the processing at and after step S104. When determining that the processing has been completed for all the determination regions (YES at S112), the control section 227 terminates the processing.

As described above, in the entry item determination processing, determination is performed on the basis of the ratio obtained when the number of pixels having the same pixel value between the document image and the stored format is divided by the number of pixels in the stored format. This provides an advantage that even when noise causes pixels in the document image to have pixel values different from their intrinsic pixel values, influence of the noise is reduced when divided by the number of pixels in the stored format.

In accordance with the determination result of entry item determination processing, in the case of presence of entry omission, the CPU (not shown) of the color image processing apparatus 2 displays on the operation panel 4 a message notifying the presence of entry omission and the item name under the entry omission among the item names of the document. Alternatively, such information may be displayed on a display or the like of a personal computer connected to the image forming apparatus 100. Further, in a case that a plurality of document sheets are read successively, when any of the read documents has entry omission, a message indicating the page number of the document sheet having the entry omission may be displayed.

Further, when entry omission has been found, processing such as copying, filing, e-mail transmission, and facsimile transmission are not performed. Further, in a case that the document is composed of a plurality of sheets, in the processing of filing, e-mail distribution, and facsimile transmission, when any one of the document sheets has entry omission, such processing may be not performed.

Figure 25:
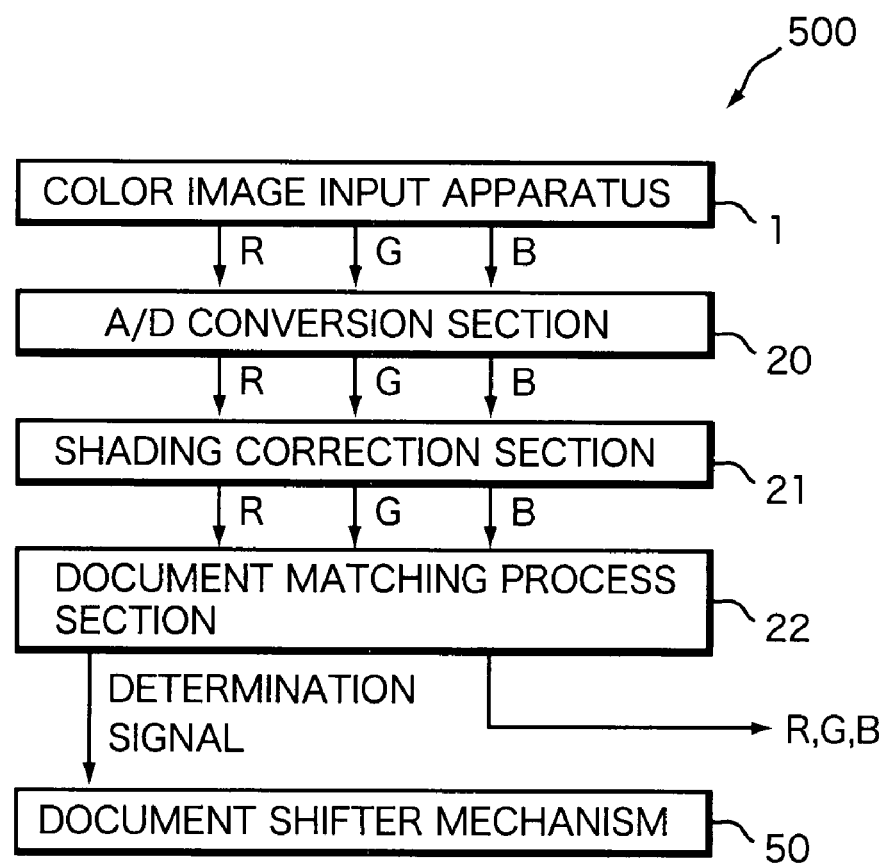
FIG. 25 is a block diagram showing a configuration of a document reading apparatus according to the present invention.

FIG. 25 is a block diagram showing the configuration of a document reading apparatus 500 according to the present invention. As shown in the figure, the document reading apparatus 500 includes a color image input apparatus 1, an A/D conversion section 20, a shading correction section 21, a document matching process section 22, and a document shifter mechanism 50. The color image input apparatus 1, the A/D conversion section 20, the shading correction section 21, and the document matching process section 22 are similar to those of the above-mentioned image forming apparatus 100, and hence description is omitted.

The document shifter mechanism 50 obtains the determination signal outputted from the document matching process section 22, and in accordance with the obtained determination signal, delivers documents with entry omission and documents without entry omission in a sorted manner. Details are described later.

Figure 26:
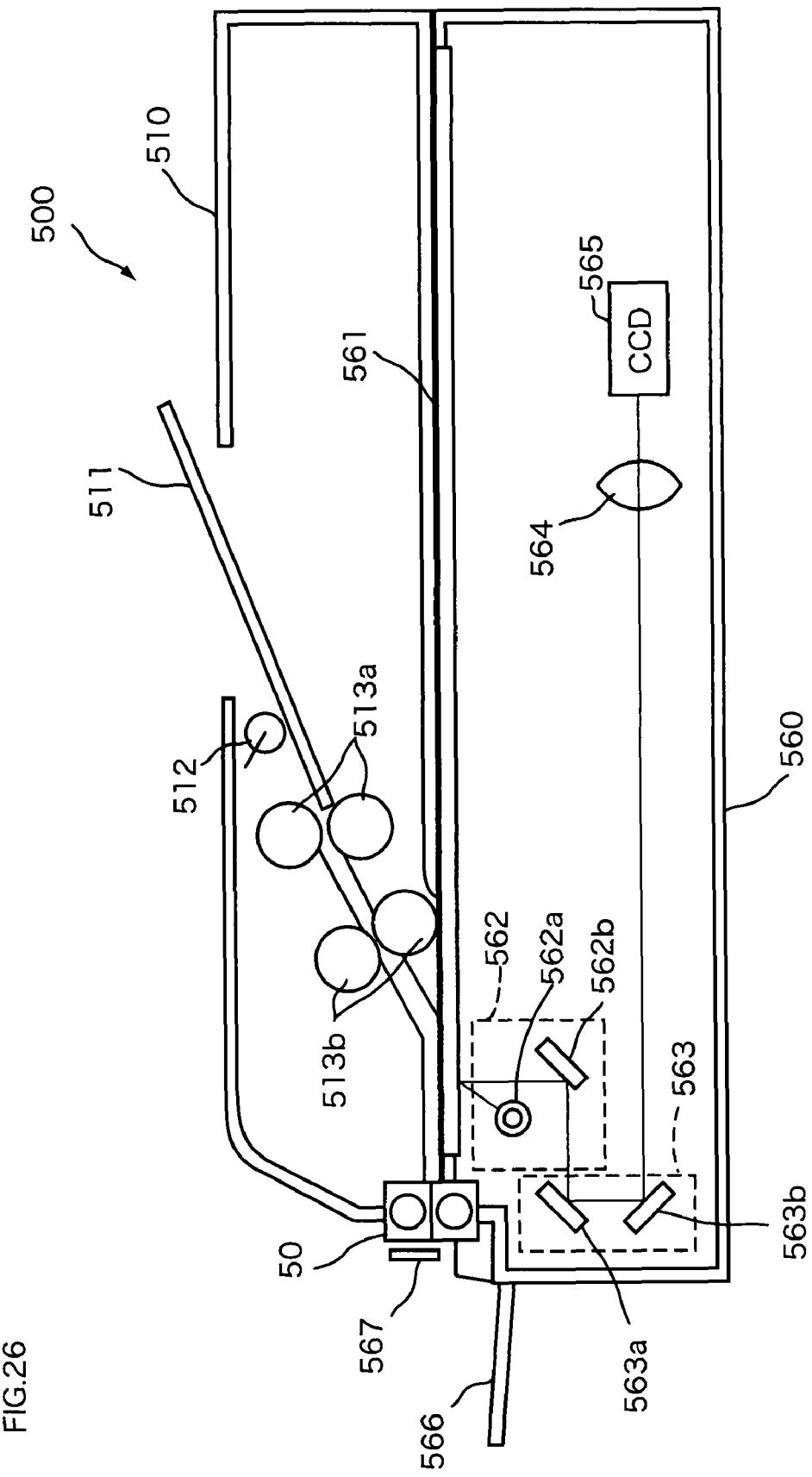
FIG. 26 is a schematic diagram showing a configuration of a document reading apparatus according to the present invention.

FIG. 26 is a schematic diagram showing the configuration of the document reading apparatus 500 according to the present invention. The document reading apparatus 500 includes: a document conveying section constructed in an upper housing 510; and a scanner section constructed in a lower housing 560.

The upper housing 510 includes: a pickup roller 512 for conveying a document one by one placed on a document tray 511; conveyance rollers 513a and 513b for conveying the document for the purpose of reading of an image in the document; a document shifter mechanism 50 for shifting the delivery position for a document in the conveyance direction (delivery direction) of the document on the basis of the determination signal inputted from the document matching process section 22 at the time of document delivery; and a document delivery sensor 567 for detecting the document under delivery. Here, the document shifter mechanism 50 is constructed to be separable into two parts of upper and lower.

The lower housing 560 includes: scanning units 562 and 563 for performing reciprocation in parallel to the lower surface of a placement base 561; an image formation lens 564; a CCD line sensor 565 which is a photoelectric converter; a document shifter mechanism 50; and a delivery tray 566. The scanning unit 562 includes: a light source 562a (e.g., a halogen lamp) for irradiating a document conveyed from the document tray 511 or a document placed on the placement base 561; and a mirror 562b for guiding to a predetermined optical path the light reflected in the document. Further, the scanning unit 563 includes mirrors 563a and 563b for guiding to a predetermined optical path the light reflected in the document.

The image formation lens 564 causes the reflected light guided from the scanning unit 563 to form an image at a predetermined position on the CCD line sensor 565. The CCD line sensor 565 performs photoelectric conversion on the formed optical image so as to output an electrical signal. That is, on the basis of a color image read from the document (e.g., the front surface of the document), data having been separated into color components of R (red), G (green), and B (blue) is outputted to the color image processing apparatus 2.

Figure 27:
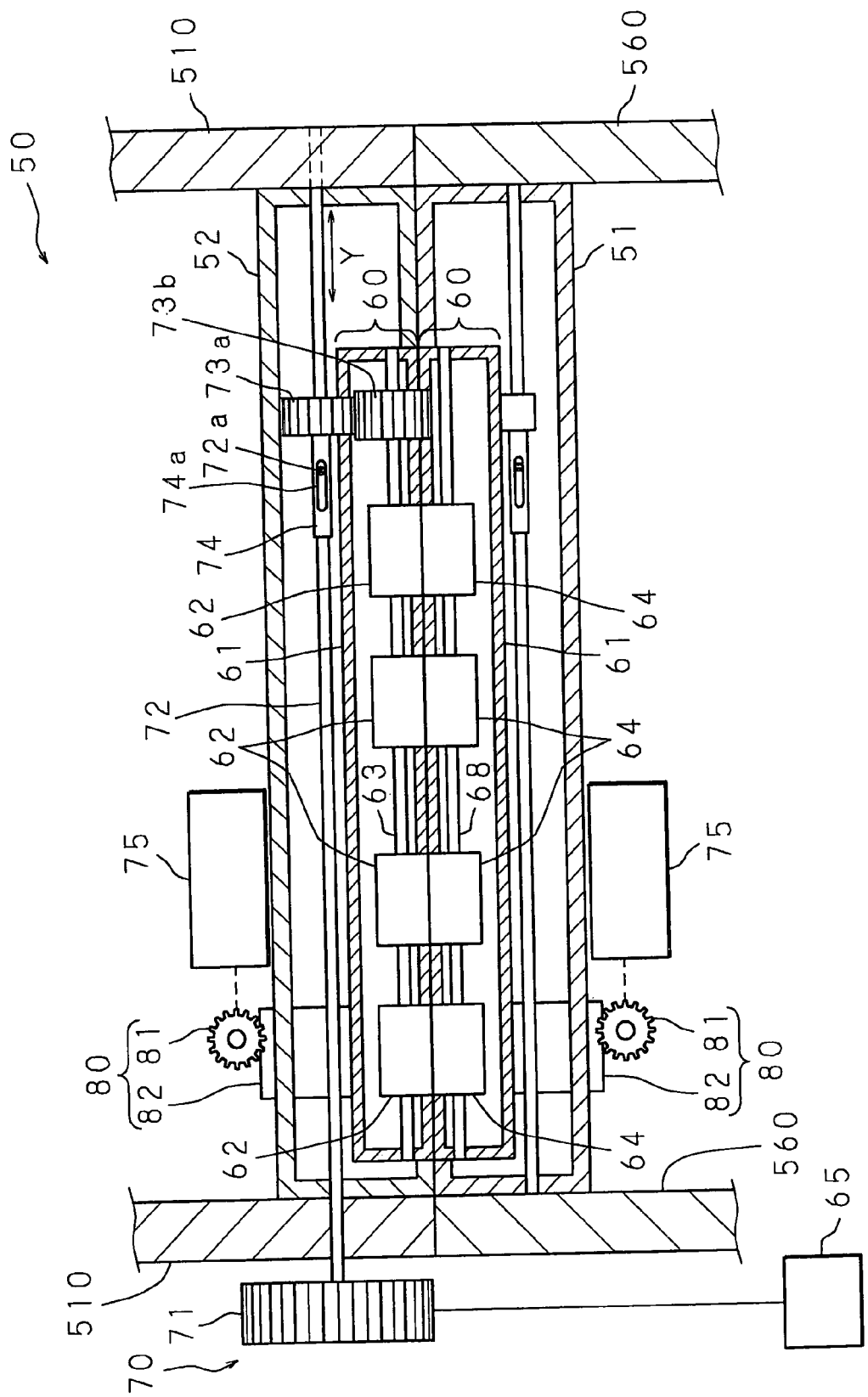
FIG. 27 is a transverse sectional view showing a configuration of a document shifter mechanism.
Figure 28:
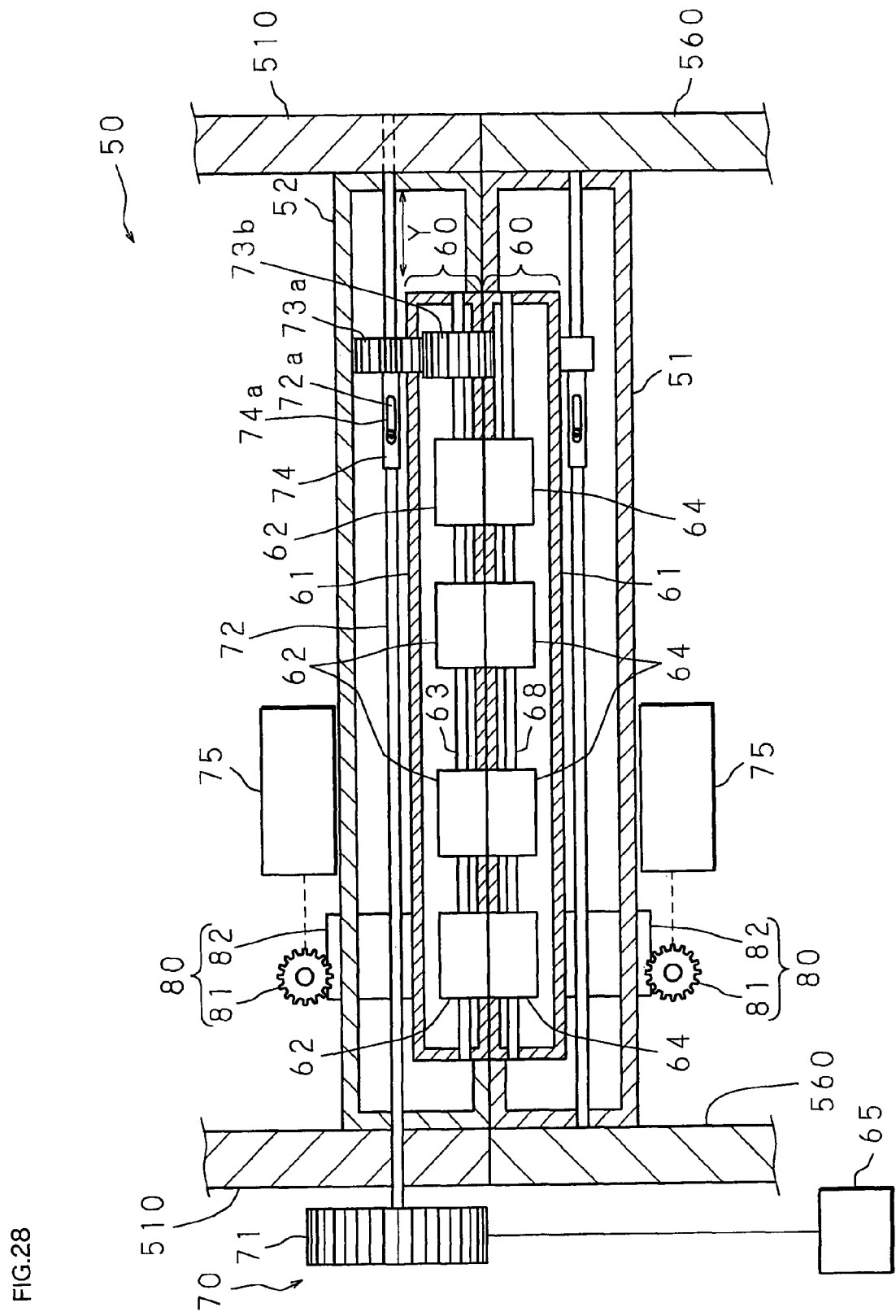
FIG. 28 is a transverse sectional view showing a configuration of a document shifter mechanism.

FIGS. 27 and 28 are transverse sectional views showing the configuration of the document shifter mechanism 50. The document shifter mechanism 50 includes bodies 51 and 52 that have a rectangular transverse cross section and that are separable into up and down. The body 51 is supported by the lower housing 560, while the body 52 is supported by the upper housing 510. The body 52 includes an offset member 60, a revolution driving source 65, a driving transmission member 70, an offset driving source 75, and an offset driving transmission member 80.

The offset member 60 is movable in the horizontal direction (in the figure, Y-direction, that is, a direction perpendicular to the document delivery direction), and includes: a body 61 having a rectangular transverse cross section and arranged inside the body 52; and offset rollers 62, . . . separated at appropriate intervals along the longitudinal direction of the body 61. When moving horizontally, the offset member 60 achieves offset document delivery (a document is delivered in a state shifted horizontally depending on the category of each document). The body 61 supports the offset rollers 62, . . . in a revolvable manner for the purpose of delivery of the document in the conveyance direction. At the time of the delivery of the document, the offset rollers 62, . . . chucks the document so as to deliver it onto the delivery tray 566.

The driving transmission member 70 includes: a driving gear 71 connected to the revolution driving source 65; a shaft 72 fitted into the center part of the driving gear 71; a linkage gear 73a arranged on the shaft 72; a sliding member 74; and a linkage gear 73b screwed to the linkage gear 73a. In the center part of the linkage gear 73b, a bar-shaped support member 63 is fitted in. On the support member 63, offset rollers 62, . . . are fixed in a state separated at appropriate intervals. Accordingly, a driving force from the revolution driving source 65 is transmitted to the offset rollers 62.

The shaft 72 is supported in a horizontally revolvable manner, while the sliding member 74 can slide on the shaft 72. Further, the shaft 72 can move the offset member 60 in a direction (horizontal direction) perpendicular to the delivery (conveyance) direction for the document, via the sliding member 74 and the linkage gears 73a and 73b. Furthermore, in order to restrict the horizontal moving range of the linkage gears 73a and 73b and the offset member 60, the shaft 72 has a restriction member 72a engaged with a hole 74a that is provided in the sliding member 74 and that is elongated in the axis direction. When moving along the inner side of the hole 74a, the restriction member 72a abuts against the two ends of the hole 74a, so that the horizontal moving range of the linkage gears 73a and 73b and the offset member 60 is restricted.

A driving force from the revolution driving source 65 is transmitted to the driving gear 71. Thus, the driving gear 71 revolves, so that the shaft 72 revolves. In response to the revolution of the shaft 72, the revolution is transmitted to the linkage gears 73a and 73b. Then, the revolution of the linkage gear 73b causes the support member 63 to revolve, so that the offset rollers 62, . . . revolve. Offset roller 64, . . . that abut against the offset rollers 62, . . . and that revolve and follow the revolution of the offset rollers 62, . . . are arranged on a support member 68 arranged in parallel to the support member 63.

To the offset driving sources 75 and 75 arranged respectively in the upper housing 510 and the lower housing 560, offset driving transmission members 80 and 80 each composed of a pinion gear 81 and a rack gear 82 are connected respectively. The bodies 61 and 61 are fixed to the rack gears 82 and 82. In response to revolution of pinion gear 81, the rack gear 82 is moved horizontally (in the Y-direction in the figure). As a result, the rack gears 82 and 82 move the bodies 61 and 61 horizontally. The offset driving sources 75 and 75 are controlled synchronously in response to the determination signal outputted from the document matching process section 22, and thereby move the bodies 61 and 61 to different positions in the horizontal direction. As a result, the offset rollers 62, . . . and the offset rollers 64, . . . are simultaneously offset (shifted) in the same direction, so that the delivery position for the document is controlled.

In comparison with the case of FIG. 27, in FIG. 28, the offset rollers 62, . . . and the offset rollers 64, . . . are offset.

Figure 29:
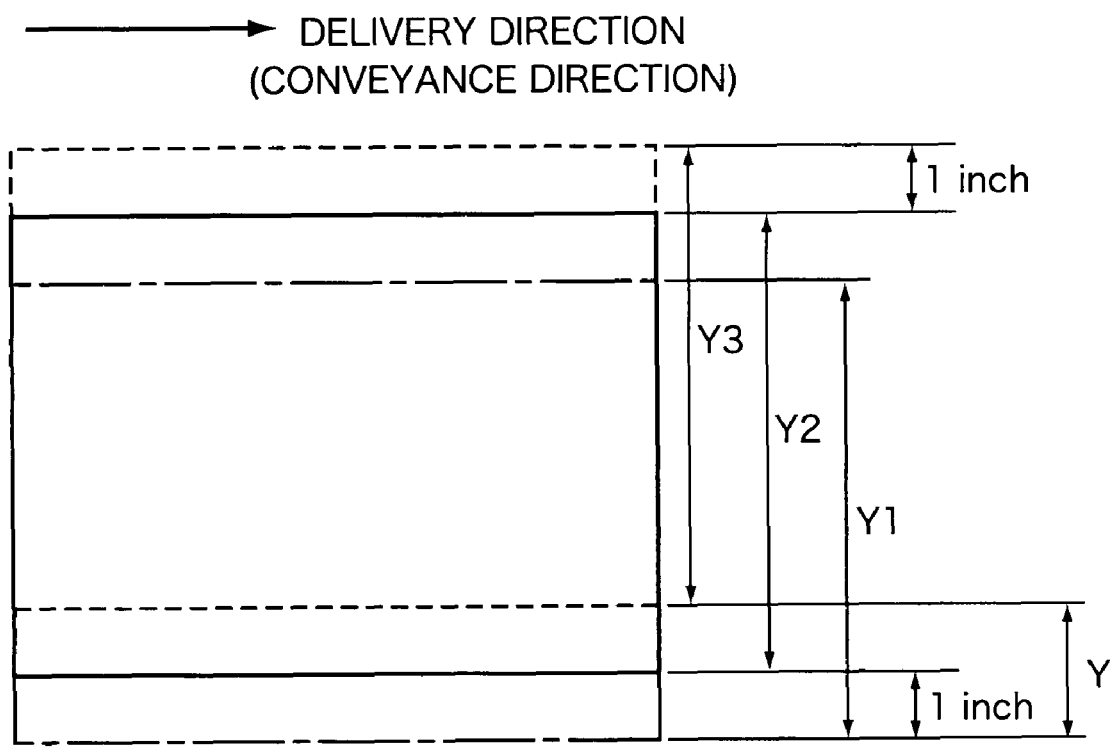
FIG. 29 is an explanation diagram showing a delivery position for a document.

FIG. 29 is an explanation diagram showing a delivery position for the document. This figure shows an exemplary case that read documents are sorted into three: documents similar to a stored format (category C1); documents not similar to a stored format (category C2); and documents similar to a stored format and having entry omission (category C3). For example, in accordance with the categories C1, C2, and C3, the delivery position for each document is offset (shifted), for example, by 1 inch or the like as indicated by Y1, Y2, and Y3 in a direction perpendicular to the delivery (conveyance) direction for the document (the Y-direction). By virtue of this, when a user desires to read a large number of documents, in addition to the advantage that documents similar to stored formats are classified easily in comparison with the conventional art, documents with entry omission can also be sorted and classified. This improves the user's convenience. Here, the offset amount (shift amount) for the documents is not limited to 1 inch.

FIGS. 30A to 30D are explanation diagrams showing examples of screen display that notifies entry omission. As shown in FIGS. 30A to 30D, screen messages displayed in the case of presence of entry omission include: "document (document name xxx) has entry omission" which indicates the presence of entry omission; "name field in document (document name xxx) is not filled in" which notifies also the part of entry omission; "page OO of document has entry omission" which specifies the page of the document with entry omission in a case that a large number of documents are read; and "document xxx has entry omission and hence was delivered in a manner separated from the other documents" which indicates that a document with entry omission has been separated and delivered. Here, the screen display is not limited to these examples.

Embodiment 2

The paper sheet material of a document to be read is not restrict to white paper, and can be recycled paper or thinly colored paper. Even in such cases, when the page background removing processing is performed on the document image, the presence or absence of entry omission can be determined with satisfactory accuracy. In this case, the page background removing processing may be performed in the document matching process section 22 (a page background removing processing section is provided in the document matching process section 22). Alternatively, the input tone correction section 23 may be provided in the subsequent stage of the shading correction section 21, and then the document matching process section 22 may be provided in the subsequent stage of the input tone correction section 23, so that the page background removing processing may be performed in the input tone correction section 23.

In a case that the page background is to be removed from the document image, the stored format is stored in a state that the page background removing processing has been performed similarly. Alternatively, the page background removing is performed on the document image such that its page background should be at the same level as the page background of the stored format. This may be achieved by setting up appropriately a density correction table used in the page background removing.

The document matching process section 22 extracts a signal obtained by correction inversion of the G signal among the RGB signals inputted from the shading correction section 21, and then generates a density histogram of the document image with a condition that, for example, 256 density steps are divided into 16 bins.

Further, the maximum of density values determined as being the page background is stored in advance as a first threshold value in the memory 226. At the same time, the number of pixels in which the pixels are determined as being the page background when exceeding that number of pixels, that is, the minimum in the number of pixels determined as being the page background, is stored in advance as a second threshold value in the memory 226. Further, a density correction table used for removing the page background in correspondence to the density segment determined as being the background is stored in the memory 226.

The document matching process section 22 searches from the high density side of the generated density histogram, so as to extract as being the background a density segment that has a density value smaller than or equal to the first threshold value density segment which is determined as being the background and that has the number of pixels greater than or equal to the second threshold value density segment. The document matching process section 22 performs the background removing processing by using the density correction table corresponding to the density segment extracted as being the page background. Here, in place of the G signal, a luminance signal (255-Yj) may be used. Here, when the color components RGB of each pixel is denoted respectively by Rj, Gj, and Bj, Yj is expressed by $Yj=0.30 \times Rj+0.59 \times Gj+0.11 \times Bj$.

Figure 31:
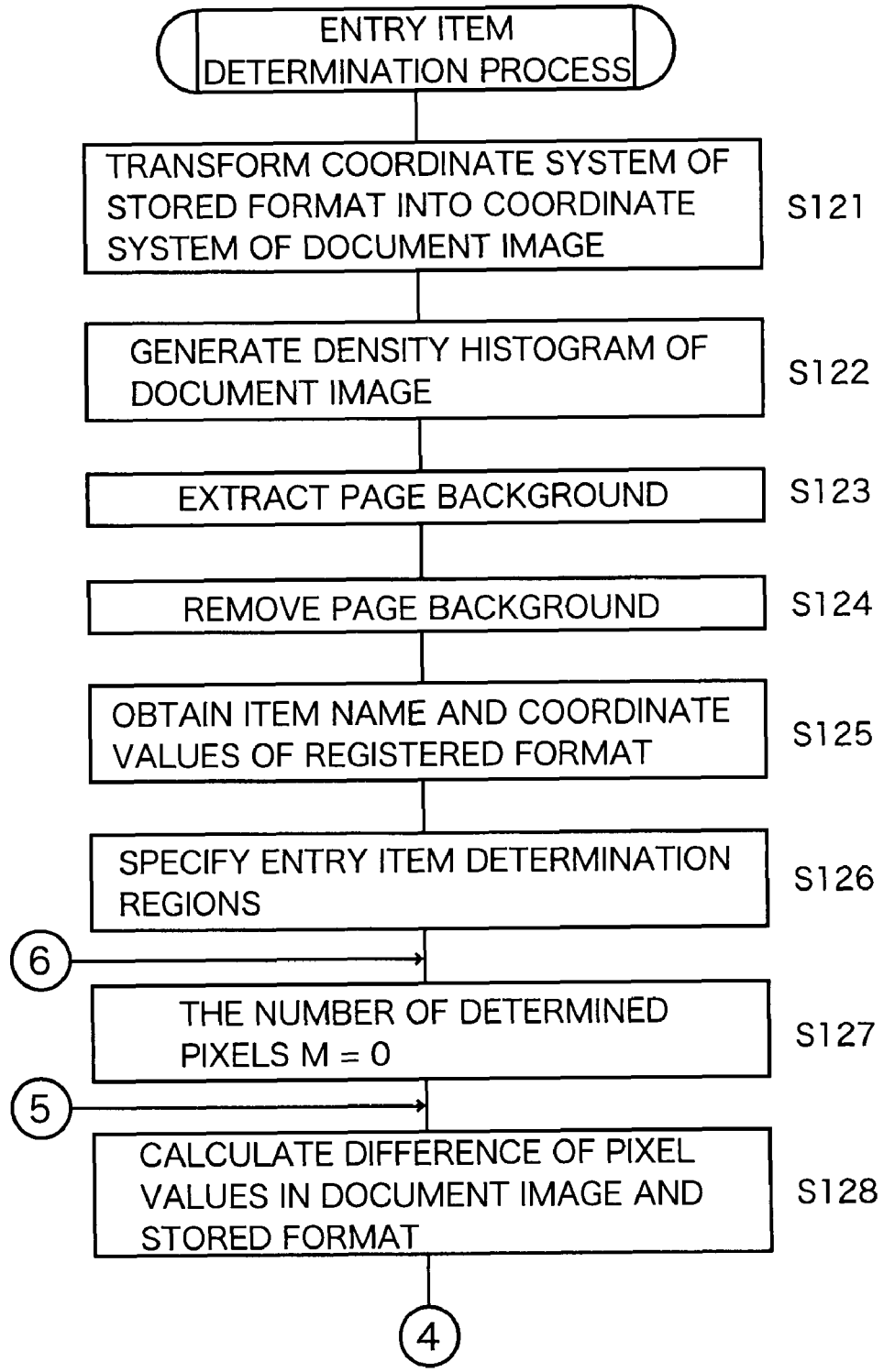
FIG. 31 is a flow chart showing a procedure of entry item determination processing according to Embodiment 2.
Figure 32:
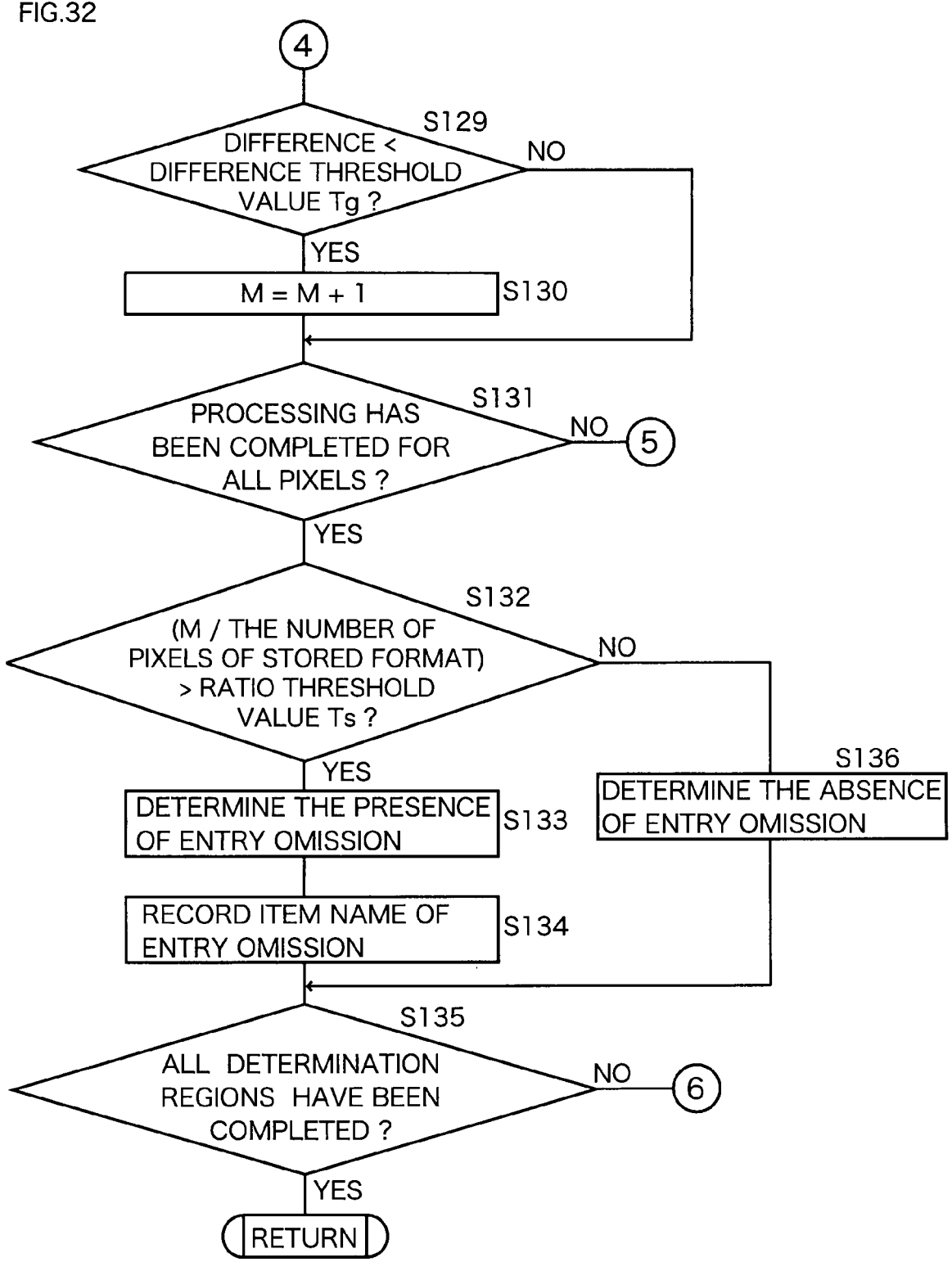
FIG. 32 is a flow chart showing a procedure of entry item determination processing according to Embodiment 2.

FIGS. 31 and 32 are flow charts showing a procedure of entry item determination processing according to Embodiment 2. The control section 227 transforms the coordinate system (coordinate values) of a stored format determined as being similar to the document image into the coordinate system (coordinate values) of the document image (S121). Here, in this case, similarly to Embodiment 1, coordinate transformation may be performed on the entire stored format. Alternatively, coordinate transformation may be performed only on entry fields having been set up in the stored format.

On the basis of the signal obtained by correction inversion of the G signal extracted from the document image, the control section 227 generates a density histogram of the document image (S122), and then extracts the page background by searching from the high density side of the generated density histogram (S123). The control section 227 removes the page background of the document image by using the density correction table corresponding to the density segment extracted as being the page background (S124).

The control section 227 searches the determination area table 2265 and thereby obtains the item names and the coordinate values of the individual item names of the stored format determined as being similar to the document image (S125). Then, on the basis of the obtained coordinate values, the control section 227 specifies, on the document image and the stored format, entry item determination regions where entry omission is to be determined (S126).

The control section 227 sets into "0" the number M of determined pixels that indicates the number of pixels having the same pixel value (e.g., luminance value) among individual pixels between the document image and the stored format (S127), and then scans the current pixels in the document image and the stored format in the entry item determination regions, so as to calculate the difference of the pixel values for each current pixel (S128).

The control section 227 determines whether the calculated difference is smaller than the difference threshold value Tg (S129). When the difference is smaller than the difference threshold value Tg (YES at S129), the control section 227 adds "1" to the number M of determined pixels (S130). The control section 227 determines whether the processing has been completed for all the pixels of the entry item determination regions in the document image and the stored format (S131). When processing for all the pixels is not yet completed (NO at S131), the control section 227 continues the processing at and after step S128.

When the difference is not smaller than the difference threshold value Tg (NO at S129), the control section 227 continues the processing at and after step S131. When the processing has been completed for all the pixels (YES at S131), the control section 227 determines whether the ratio expressed by (the number M of determined pixels/the number of pixels in the stored format) is greater than the ratio threshold value Ts (S132).

When the ratio is greater than the ratio threshold value Ts (YES at S132), the control section 227 concludes the presence of entry omission (S133), then records item names with entry omission (S134), and then determines whether processing for all the determination regions has been completed (S135). On the other hand, when the ratio is not greater than the ratio threshold value Ts (NO at S132), the control section 227 concludes the absence of entry omission (S136), and then continues the processing at and after step S135.

When determining that processing for all the determination regions is not yet completed (NO at S135), the control section 227 continues the processing at and after step S127. When determining that the processing has been completed for all the determination regions (YES at S135), the control section 227 terminates the processing.

As a result, even when the paper sheet material of the read document is recycled paper or thinly colored paper, the presence or absence of entry omission can be determined with satisfactory accuracy.

Embodiment 3

Embodiments 1 and 2 have been described for the configuration that the presence or absence of entry omission is determined on the basis of the ratio expressed by (the number M of determined pixels/the number of pixels in the stored format). However, the entry omission determination processing is not limited to this configuration. That is, entry omission determination processing may be achieved by the document matching process section 22 calculating the number of pixels.

Figure 33:
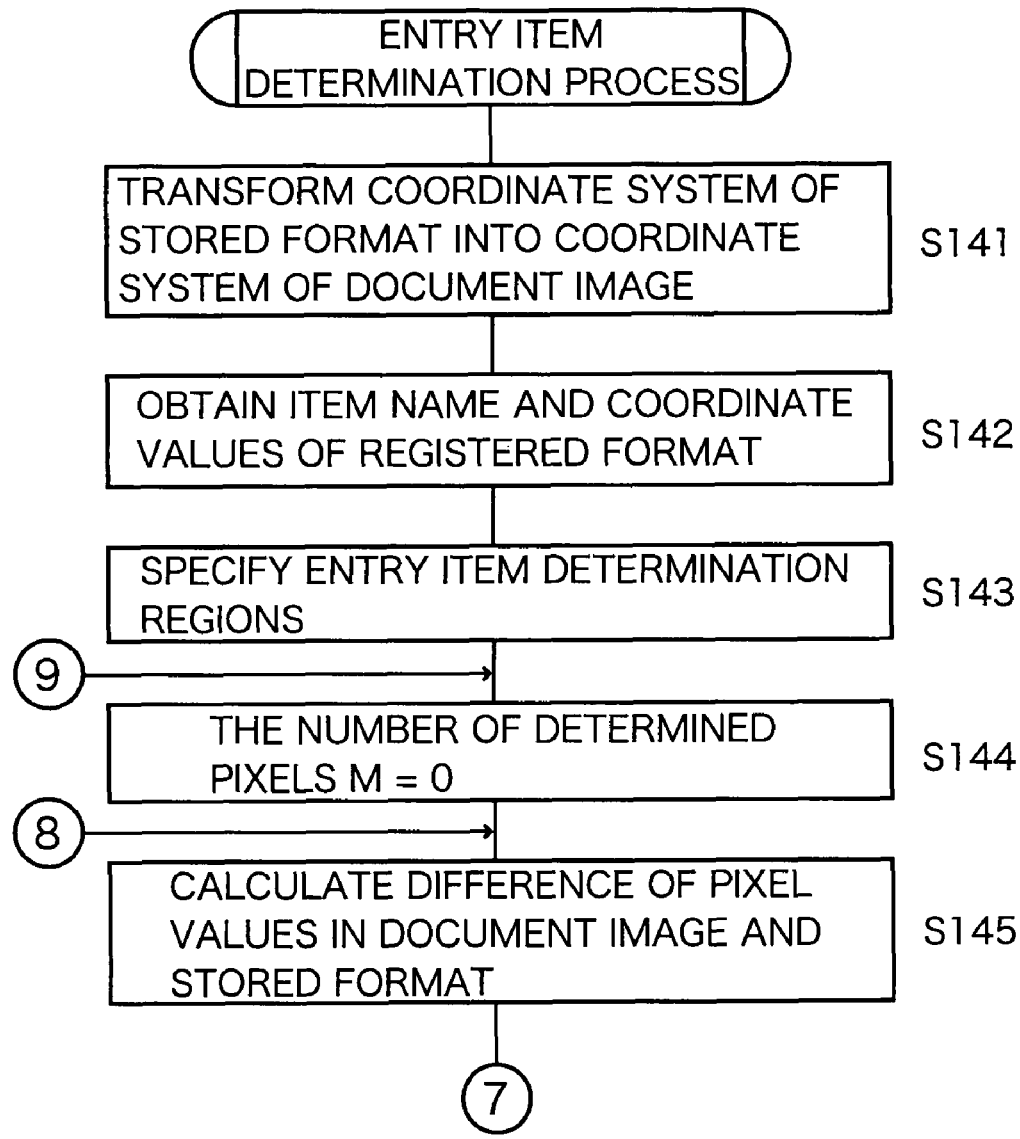
FIG. 33 is a flow chart showing a procedure of entry item determination processing according to Embodiment 3.
Figure 34:
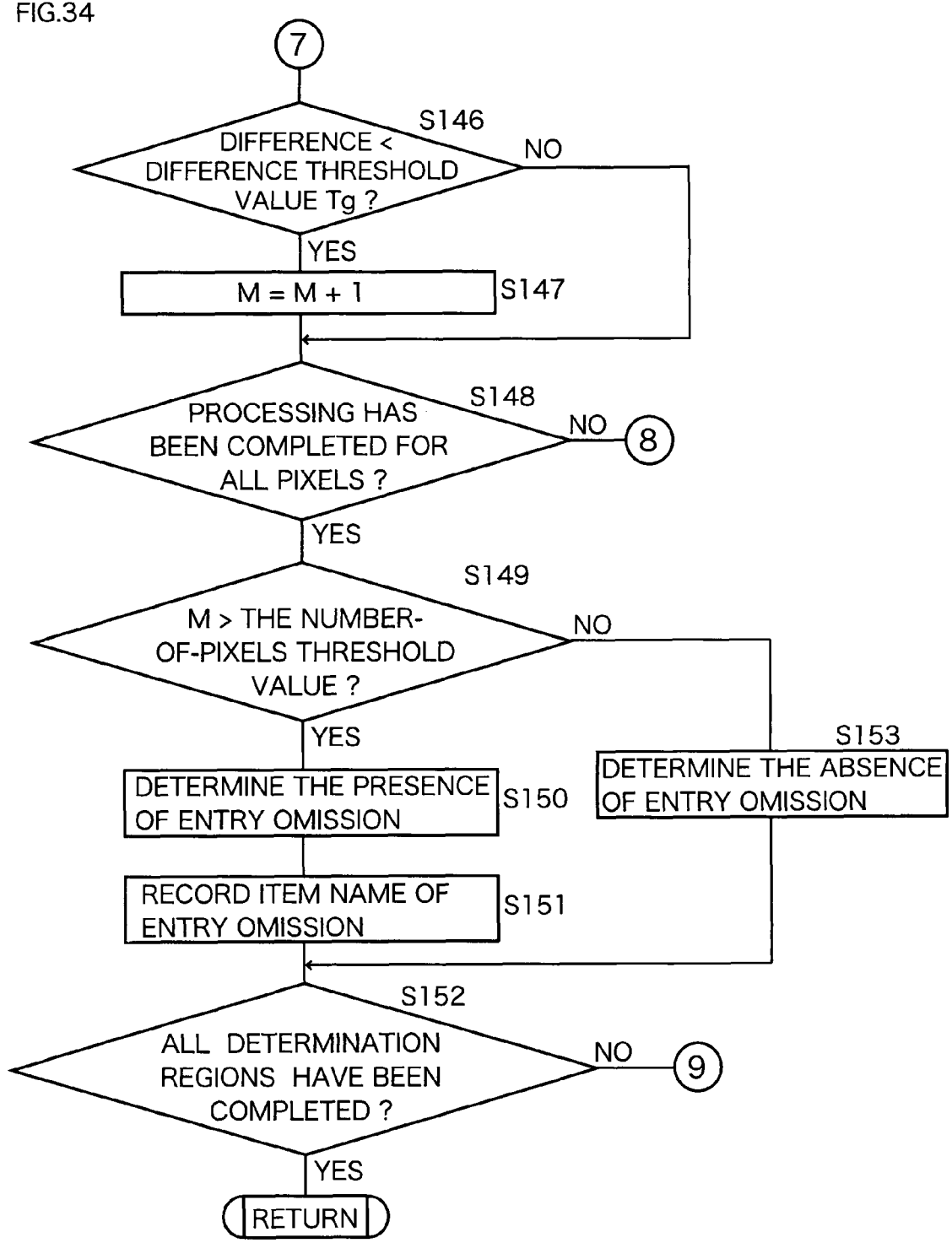
FIG. 34 is a flow chart showing a procedure of entry item determination processing according to Embodiment 3.

FIGS. 33 and 34 are flow charts showing a procedure of entry item determination processing according to Embodiment 3. The control section 227 transforms the coordinate system (coordinate values) of a stored format determined as being similar to the document image into the coordinate system (coordinate values) of the document image (S141). In this case, coordinate transformation may be performed on the entire stored format. Alternatively, coordinate transformation may be performed only on entry fields determined in advance in the stored format.

The control section 227 searches the determination area table 2265 and thereby obtains the item names and the coordinate values of the individual item names of the stored format determined as being similar to the document image (S142). Then, on the basis of the obtained coordinate values, the control section 227 specifies, on the document image and the stored format, entry item determination regions where entry omission is to be determined (S143).

The control section 227 sets into "0" the number M of determined pixels that indicates the number of pixels having the same pixel value (e.g., luminance value) among individual pixels between the document image and the stored format (S144), and then scans the current pixels in the document image and the stored format in the entry item determination regions, so as to calculate the difference of the pixel values for each current pixel (S145).

The control section 227 determines whether the calculated difference is smaller than the difference threshold value Tg (S146). When the difference is smaller than the difference threshold value Tg (YES at S146), the control section 227 adds "1" to the number M of determined pixels (S147). The control section 227 determines whether the processing has been completed for all the pixels of the entry item determination regions in the document image and the stored format (S148). When processing for all the pixels is not yet completed (NO at S148), the control section 227 continues the processing at and after step S145.

When the difference is not smaller than the difference threshold value Tg (NO at S146), the control section 227 continues the processing at and after step S148. When the processing has been completed for all the pixels (YES at S148), the control section 227 determines whether the number M of determined pixels is greater than the number-of-pixels threshold value (S149).

When the number M of determined pixels is greater than the number-of-pixels threshold value (YES at S149), the control section 227 concludes the presence of entry omission (S150), then records item names with entry omission (S151), and then determines whether processing for all the determination regions has been completed (S152). On the other hand, when the number M of determined pixels is not greater than the number-of-pixels threshold value (NO at S149), the control section 227 concludes the absence of entry omission (S153), and then continues the processing at and after step S152.

When determining that processing for all the determination regions is not yet completed (NO at S152), the control section 227 continues the processing at and after step S144. When determining that the processing has been completed for all the determination regions (YES at S152), the control section 227 terminates the processing.

When the configuration that the number of pixels is calculated is adopted, the presence or absence of entry omission can be determined with satisfactory accuracy even in the case of tiny entry omission regardless of the size of the area of the entry field in the document.

In this case, in the entry item determination processing, in the determination regions (determination parts), the differences of the pixel values owned by the obtained document image and the stored format (stored image) are calculated. Then the calculated difference values are compared with a predetermined threshold value (difference threshold value), so that the number of pixels (the number of determined pixels) having approximately the same pixel value is calculated. Then, the calculated number of determined pixels is compared with a predetermined threshold value (large and small comparison). Then, the presence or absence of entry omission is determined in accordance with the comparison result.

Embodiment 3 described above has the configuration that the presence or absence of entry omission is determined on the basis of the number of the pixels having approximately the same pixel value with respect to the current pixel between the document image and the stored format. However, the present invention is not limited to this. For example, the number of pixels having different pixel values with each other with respect to the current pixel between the document image and the stored format may be calculated in the entry omission determination regions. Then, the calculated number of pixels may be compared with a predetermined threshold value, so that the presence or absence of entry omission may be determined. In this case, it is determined whether the number of pixels having different pixel values with each other is smaller than a predetermined threshold value. Then, when the number of pixels having different pixel values is smaller than the predetermined threshold value, the presence of entry omission is concluded. In contrast, when the number of pixels having different pixel values is not smaller than the predetermined threshold value, the absence of entry omission is concluded.

Further, the document image and the stored format within the entry omission determination regions may be binarized with a predetermined binarization threshold value. Then, the numbers of pixels after the binarization may be calculated. Then, entry omission may be determined on the basis of the difference in the calculated numbers of pixels. In this case, for example, when the difference between the number of pixels in the document image and the number of pixels in the stored format is smaller than a predetermined number-of-pixels threshold value, the presence of entry omission is concluded. In contrast, when the difference is not smaller than the predetermined number-of-pixels threshold value, the absence of entry omission is concluded. Further, in place of the configuration that the number of pixels after binarization is calculated, the number of black pixels in the document image may be calculated.

Further, the processing of determining the presence or absence of entry omission on the basis of the ratio shown in FIGS. 23 and 24 (or FIGS. 31 and 32) and the processing of determining the presence or absence of entry omission by calculating the number of pixels shown in FIGS. 33 and 34 may be employed simultaneously. In this case, when the ratio expressed by (the number M of determined pixels/the number of pixels in the stored format) is greater than the ratio threshold value Ts and the number M of determined pixels is greater than the number-of-pixels threshold value, the control section 227 concludes the presence of entry omission. In contrast, when the ratio expressed by (the number M of determined pixels/the number of pixels in the stored format) is not greater than the ratio threshold value Ts and the number M of determined pixels is not greater than the number-of-pixels threshold value, the control section 227 concludes the absence of entry omission. Here, when any one of the criteria is not satisfied, priority may be imparted to any one of the determination results depending on the kind of the document or the like.

When the entry omission determination based on the ratio and the entry omission determination based on the number of pixels are employed simultaneously, determination accuracy for the presence or absence of entry omission is improved further.

Embodiment 4

Embodiments 1 to 3 have been described for the configuration that the document shifter mechanism 50 is provided. However, the configuration of the document shifter mechanism is not limited to that the document is offset when delivered. That is, the delivery tray may be moved in a direction perpendicular to the delivery (conveyance) direction for the document. In this case, the document need not be shifted by the document shifter mechanism. That is, mere a mechanism for document delivery (conveyance) is sufficient.

Figure 35:
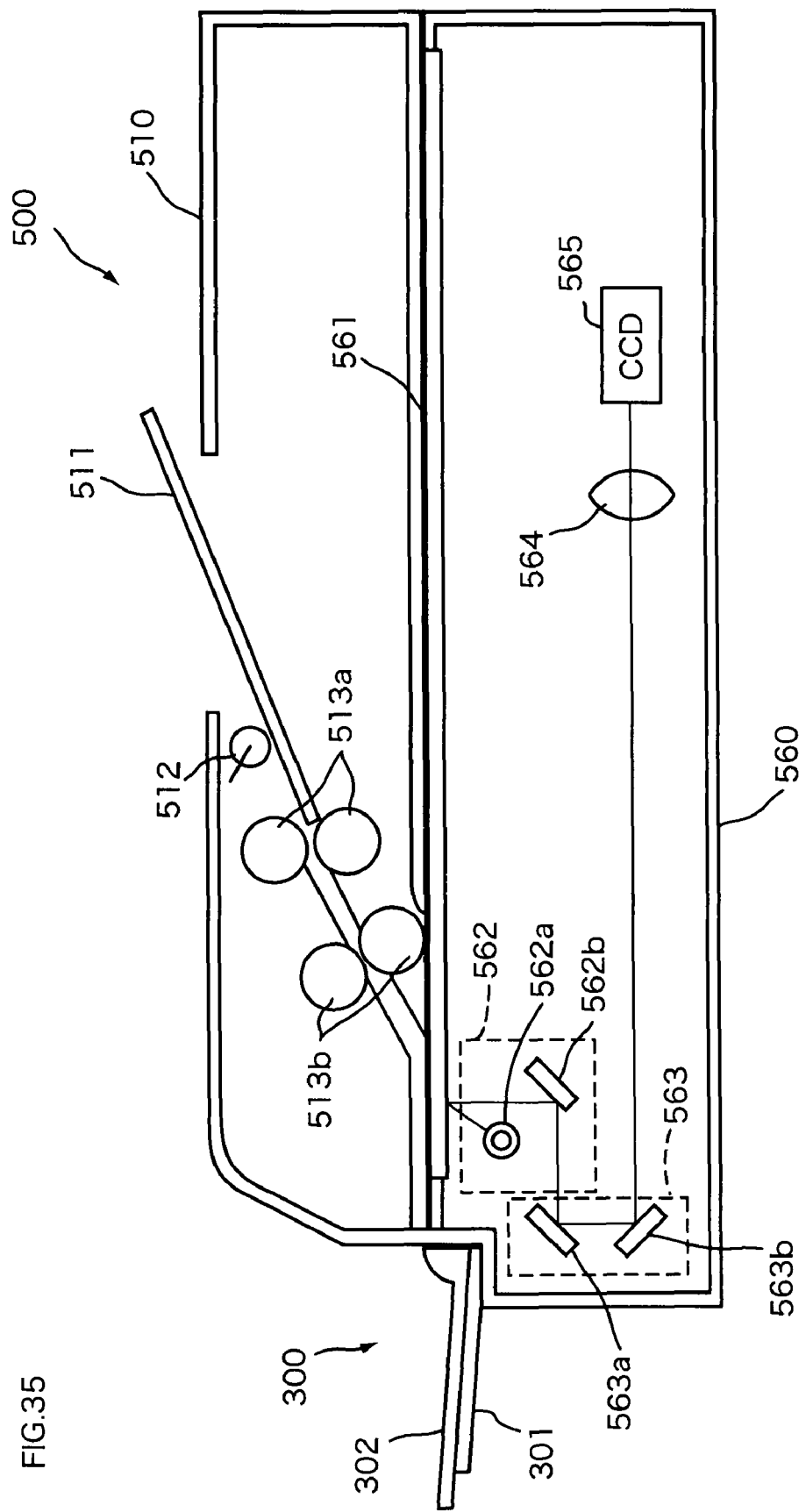
FIG. 35 is a schematic diagram showing a configuration of a document shifter mechanism in a case that a delivery tray is movable.
Figure 36:
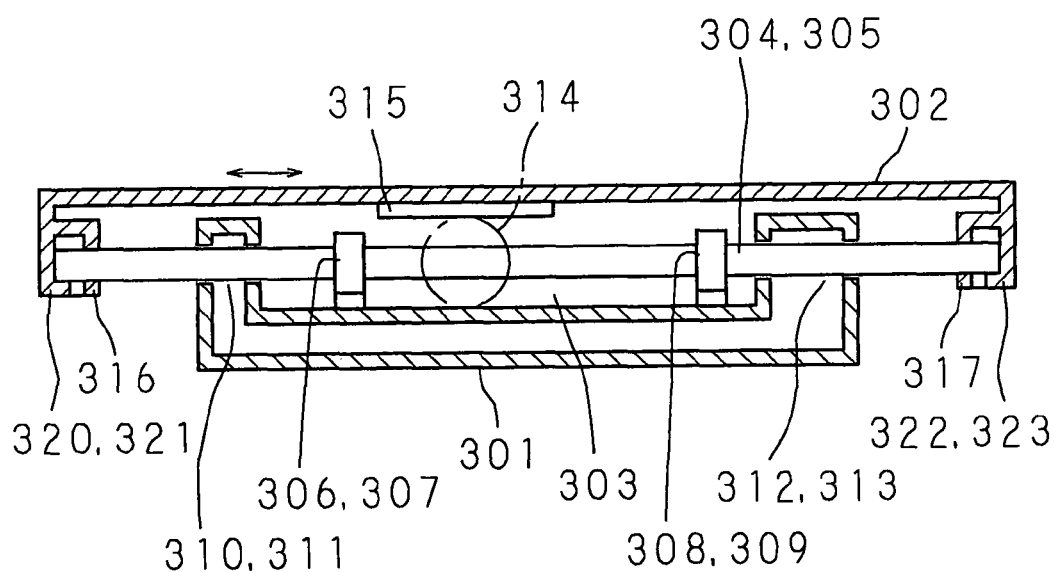
FIG. 36 is a transverse sectional view showing a configuration of a document shifter mechanism.

FIG. 35 is a schematic diagram showing the configuration of a document shifter mechanism 300 in a case that a delivery tray is movable. FIG. 36 is a transverse sectional view showing the configuration of the document shifter mechanism 300. The document shifter mechanism 300 includes: a supporting tray member 301 fixed to the main body of the document reading apparatus; and a movable tray member 302 arranged on the supporting tray member 301. Here, the configuration of the document reading apparatus 500 is similar to that of Embodiment 1. Thus, like parts are denoted by like numerals, and description is omitted.

In the supporting tray member 301, a recess 303 is provided that has a rectangular shape in a plane view and is slightly smaller than the outer dimension. Two metal bar-shaped guide shafts 304 and 305 separated at an appropriate interval approximately in parallel to each other are attached in a manner of being accommodated in the recess 303. Specifically, the guide shafts 304 and 305 are inserted through respectively through holes 310, 311, 312, and 313 formed in the side walls of the supporting tray member 301 and bearings 306, 307, 308, and 309 provided vertically on the bottom surface of the recess 303 at appropriate intervals, and then are supported by the bearings 306, 307, 308, and 309 in a movable manner.

In the center part of the recess 303, a driving unit (not shown) is provided that includes; a motor; a reduction gearbox (not shown) incorporating a gear train is built; and a pinion 314. The revolution of the motor is slowed down by the gear train and then transmitted to the pinion 314. In the inside of the upper face of the movable tray member 302, a rack 315 is attached that is arranged in parallel to the guide shafts 304 and 305 and engages with the pinion 314. When the pinion 314 revolves, the rack 315 moves in the direction of the axes of the guide shafts 304 and 305.

Further, in the side edge parts of the movable tray member 302, protruding rim sections 316 and 317 are formed along the side edges (in the conveyance direction for the document). In the protruding rim sections 316 and 317, bearings 320, 321, 322, and 323 are provided into which the individual ends of the guide shafts 304 and 305 are inserted respectively and which support the guide shafts 304 and 305 in a movable manner. By virtue of the configuration described here, when the motor is driven so that the pinion 314 revolves, the revolution of the pinion 314 is transmitted to the rack 315. Thus, the movable tray member 302 is guided by the guide shafts 304 and 305 so as to move in a direction (the direction indicated by an arrow in the figure) perpendicular to the conveyance direction for the sheet relative to the supporting tray member 301. Here, the means for moving the movable tray member 302 is not limited to a rack and pinion mechanism, and may be another mechanism such as an endless belt mechanism and a linear motor.

In a case that the movable tray member 302 is to be moved in a direction perpendicular to the delivery (conveyance) direction for the document, for example, similarly to Embodiment 1, the amount of movement may be 1 inch or the like. By virtue of this, when a user desires to read a large number of documents, in addition to the advantage that documents similar to stored formats are classified easily in comparison with the conventional art, documents with entry omission can also be sorted and classified. This improves the user's convenience. Here, the offset amount (shift amount) for the documents is not limited to 1 inch.

Embodiment 5

Embodiments 1 to 4 have been described for the configuration that the document is offset at the time of delivery. However, the method of delivering documents in a sorted manner is not limited to this. That is, a plurality of delivery trays may be provided. Then, in response to the determination signal, the delivery tray into which the document is to be delivered may be switched.

Figure 37:
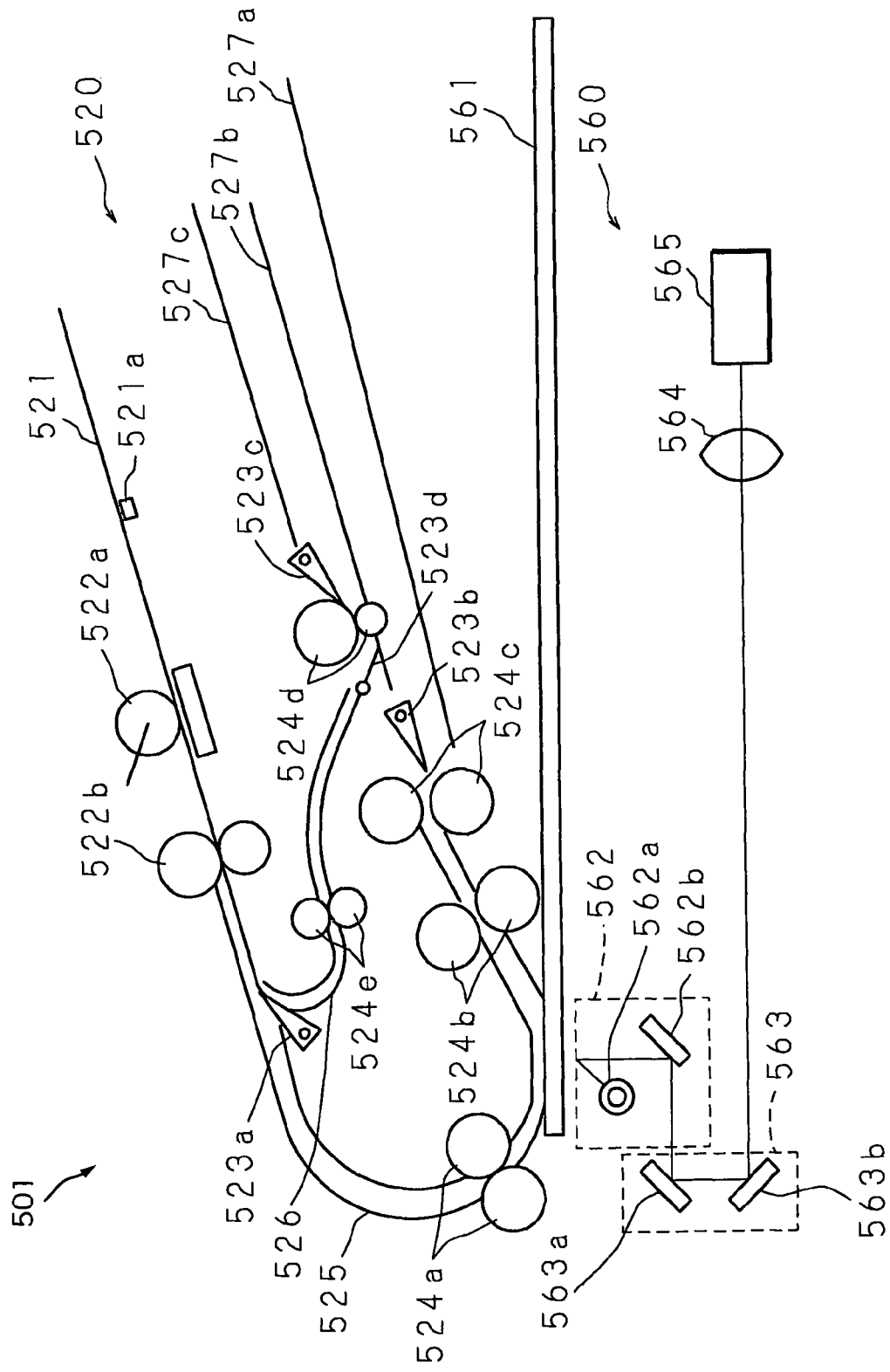
FIG. 37 is a schematic diagram showing a configuration of a document reading apparatus according to Embodiment 5.

FIG. 37 is a schematic diagram showing the configuration of a document reading apparatus 501 according to Embodiment 5. A document conveying section 520 includes: a document tray 521; a pickup roller 522a a shuffling roller 522b that are revolvable and that convey one by one the document sheets placed and stacked in the document tray 521; a conveyance path 525 for conveying the conveyed document to delivery trays 527a, 527b, and 527c; and a resist roller 524a, a conveyance roller 524b, and a delivery roller 524c appropriately provided in the middle of the conveyance path 525.

In the downstream of the delivery roller 524c, gates 523b, 523d (located downward by means of flexibility or self-weight), and 523c are provided that switch the delivery tray into which the document is to be delivered. A conveyance roller 524d is arranged between the gate 523d and the gate 523c. When the document is delivered, on the basis of the determination signal, the gates 523b, 523d, and 523c are driven such that read documents (category C1) being similar to the stored format are delivered into the delivery tray 527a, documents (category C2) not being similar to the stored format are delivered to the delivery tray 527b, and documents (category C3) being similar to the stored format and having entry omission are delivered into the delivery tray 527c.

That is, when a document of category C1 is to be delivered, the gate 523b is driven upward, so that the document is delivered into the delivery tray 527a. Further, when a document of category C2 is to be delivered, the gate 523b is driven downward while the gate 523c is driven upward, so that the document is delivered to the delivery tray 527b. Furthermore, when a document of category C3 is to be delivered, the gate 523b is driven downward while the gate 523c is driven downward, so that the document is delivered to the delivery tray 527c.

In the document placing surface of the document tray 521, a document sensor 521a is provided that detects the presence or absence of a document. When all the documents placed in the document tray 521 have been conveyed out, the document sensor 521a outputs a signal that indicates that no document is present. This permits determination whether the conveyance-out of all the document has been completed.

In the downstream of the shuffling roller 522b, a document conveyance path 526 is provided that is separated from the conveyance path 525 and curved by approximately 180 degrees. In the middle of the document conveyance path 526, a revolvable document roller 524e is provided, while the delivery tray 527c is attached in a manner connecting to the document conveyance path 526. The pickup roller 522a, the shuffling roller 522b, and the document roller 524e revolve in forward and backward directions by means of a roller driving section (not shown).

At the branch point between the conveyance path 525 and the document conveyance path 526, a gate 523a is arranged that can swing by means of a gate driving section (not shown). When the gate 523a is driven downward, a document placed in the document tray 521 is conveyed toward the conveyance path 525. On the other hand, when the gate 523a is driven upward, a document once delivered into the delivery tray 527c is conveyed to the document tray 521. That is, in the present embodiment, when a document with entry omission need be read again, re-reading can be performed automatically.

The scanner section constructed in the lower housing 560 is similar to that of Embodiments 1 to 4. Thus, like parts are denoted by like numerals, and description is omitted.

Embodiment 6

Embodiment 5 has been described for the configuration that a plurality of delivery trays are built in the document reading apparatus 501. However, the method of delivering documents in a sorted manner is not limited to this, and another configuration may be adopted. For example, a configuration may be employed in which in place of the delivery trays, an option mechanism is provided that has a plurality of steps of delivery trays.

Figure 38:
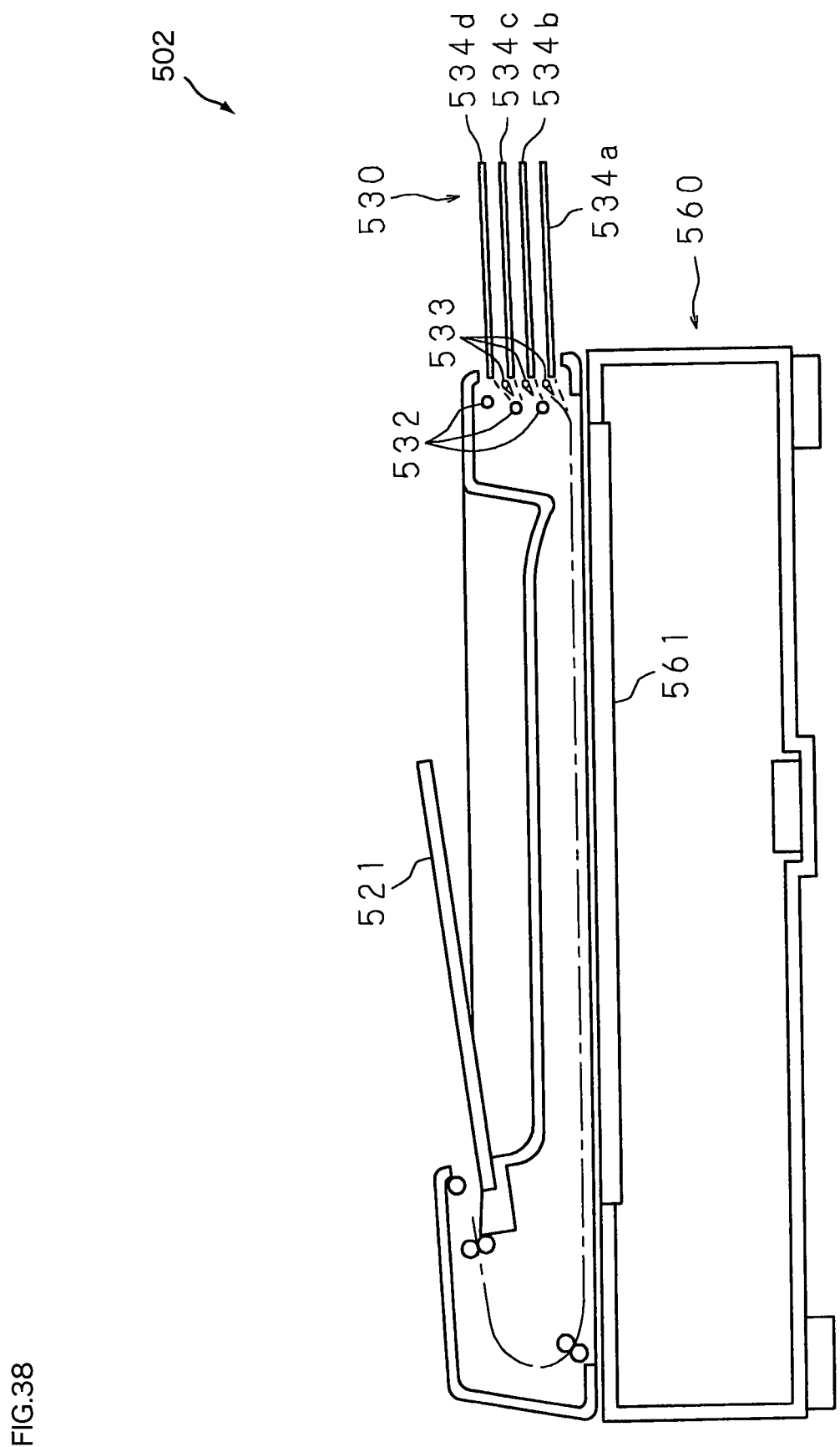
FIG. 38 is a schematic diagram showing a configuration of a document reading apparatus according to Embodiment 6.

FIG. 38 is a schematic diagram showing the configuration of a document reading apparatus 502 according to Embodiment 6. As shown in the figure, an option mechanism 530 is provided that delivers documents in a sorted manner. The option mechanism 530 includes: delivery trays 534a, 534b, 534c, and 534d; gates 533, . . . for switching the conveyance path for the document in order to deliver the document into each delivery tray in a sorted manner; and delivery rollers 532, . . . .

Embodiment 7

In each embodiment described above, in the determination of the presence or absence of entry omission, the pixel values have been compared between the document image and the stored format. However, the method of determination of the presence or absence of entry omission is not limited to this. That is, without the necessity of comparison with the pixel value of the stored format, the presence or absence of entry omission in the document image can be determined only on the basis of the document image.

Figure 39:
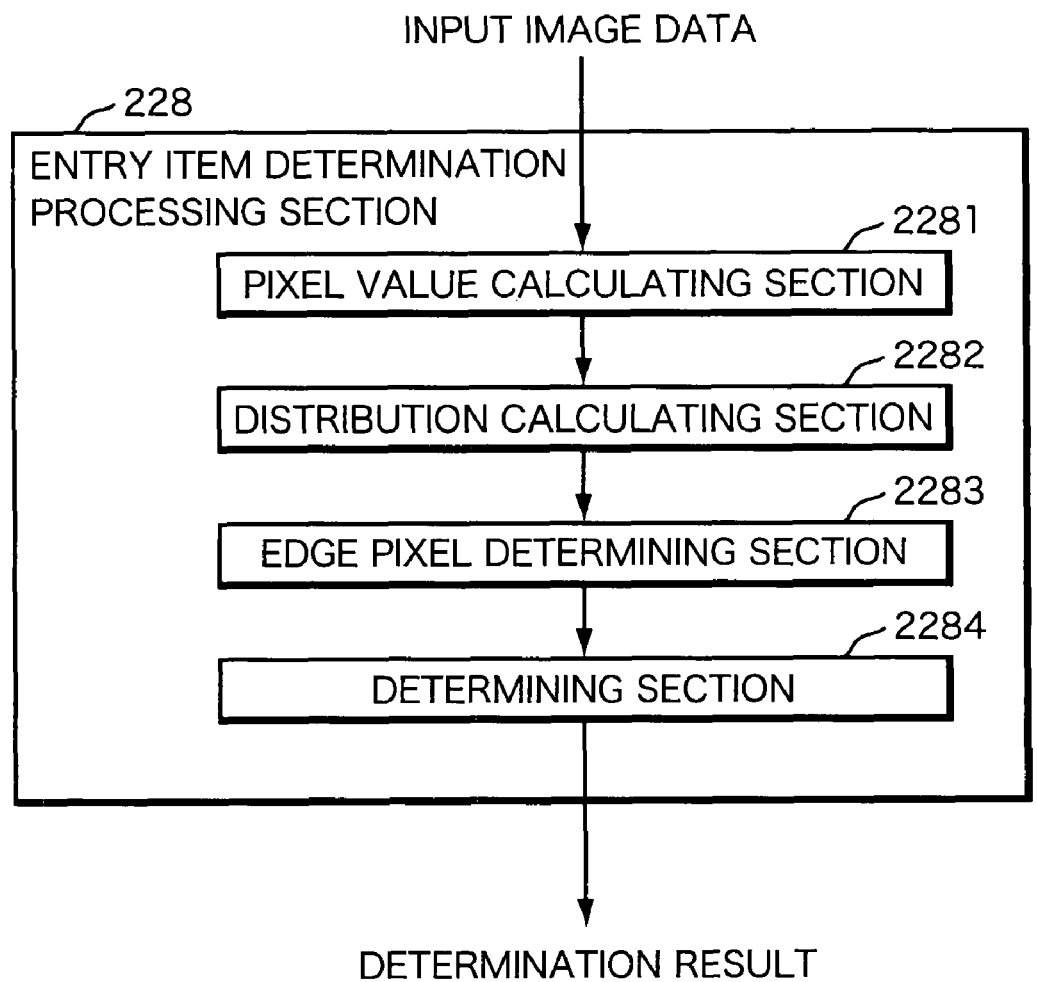
FIG. 39 is a block diagram showing a configuration of an entry item determination processing section according to Embodiment 7.

FIG. 39 is a block diagram showing the configuration of an entry item determination processing section 228 according to Embodiment 7. The entry item determination processing section 228 includes a pixel value calculating section 2281, a distribution calculating section 2282, an edge pixel determining section 2283, and a determining section 2284. Processing in the individual sections described here is controlled by the control section 227. Further, data obtained in the individual sections described here is stored in the memory 226. Similarly to Embodiment 1, before the determination processing whether a document image has entry omission, the entry item determination processing section 228 performs: position alignment processing for aligning the positions between the document image and the stored format; and the processing of specifying entry omission determination regions. The contents of the processing is similar to that of Embodiment 1, and hence description is omitted.

For each pixel within a pixel block (e.g., a first pixel block composed of 7×7 pixels) composed of a plurality of pixels containing a current pixel in an inputted document image (image data), the pixel value calculating section 2281 calculates the average of the density values of the individual pixels within a pixel block (e.g., a second pixel block composed of 7×7 pixels) composed of a plurality of pixels containing the above-mentioned each pixel, and then adopts the calculated average as the pixel value of the above-mentioned each pixel. As a result, the average of each pixel (49 pixels, in this example) in the first pixel block containing the current pixel is obtained. Here, the pixel value to be calculated is not limited to the average. That is, another quantity may be calculated like the central value of the density values of the individual pixels in the second pixel block.

The distribution calculating section 2282 searches for the average of each pixel within the first pixel block composed of a plurality of pixels containing the current pixel, and then calculates the maximum density difference in the first pixel block. Here, the value to be calculated is not limited to the maximum density difference. That is, the variance or the like may be calculated as long as the distribution of the pixel values in the first pixel block can be recognized.

The edge pixel determining section 2283 compares the maximum density difference calculated by the distribution calculating section 2282 with an edge determination threshold value (e.g., 30) defined in advance. Then, when the maximum density difference is greater than the edge determination threshold value, the edge pixel determining section 2283 determines that the current pixel in the first pixel block is an edge pixel, and then adds 1 to the number of edge pixels so as to count the number of edge pixels.

Here, the above-mentioned processing of pixel value calculation, distribution calculation, and edge pixel determination is repeated for all the current pixels in the document image.

For each document image, the determining section 2284 compares the number of edge pixels counted by the edge pixel determining section 2283 with a predetermined first determination threshold value (e.g., 5000). Then, when the number of edge pixels is greater than the first determination threshold value, the determining section 2284 determines that the document image has no entry omission, that is, has an entry. In contrast, when the number of edge pixels is smaller than the first determination threshold value, the determining section 2284 determines that the document image has entry omission, that is, does not have an entry.

When the document image is a color document, the entry item determination processing section 228 may perform the above-mentioned processing for each plane (each color component) of RGB. Further, in a case that the current pixel is determined as being an edge pixel when the maximum density difference of any color component among a plurality of color components is greater than the edge determination threshold value, the page background removing need not be performed. Here, the above-mentioned processing may be performed only on a part of the color components. In this case, the processing ability is reduced.

Figure 40:
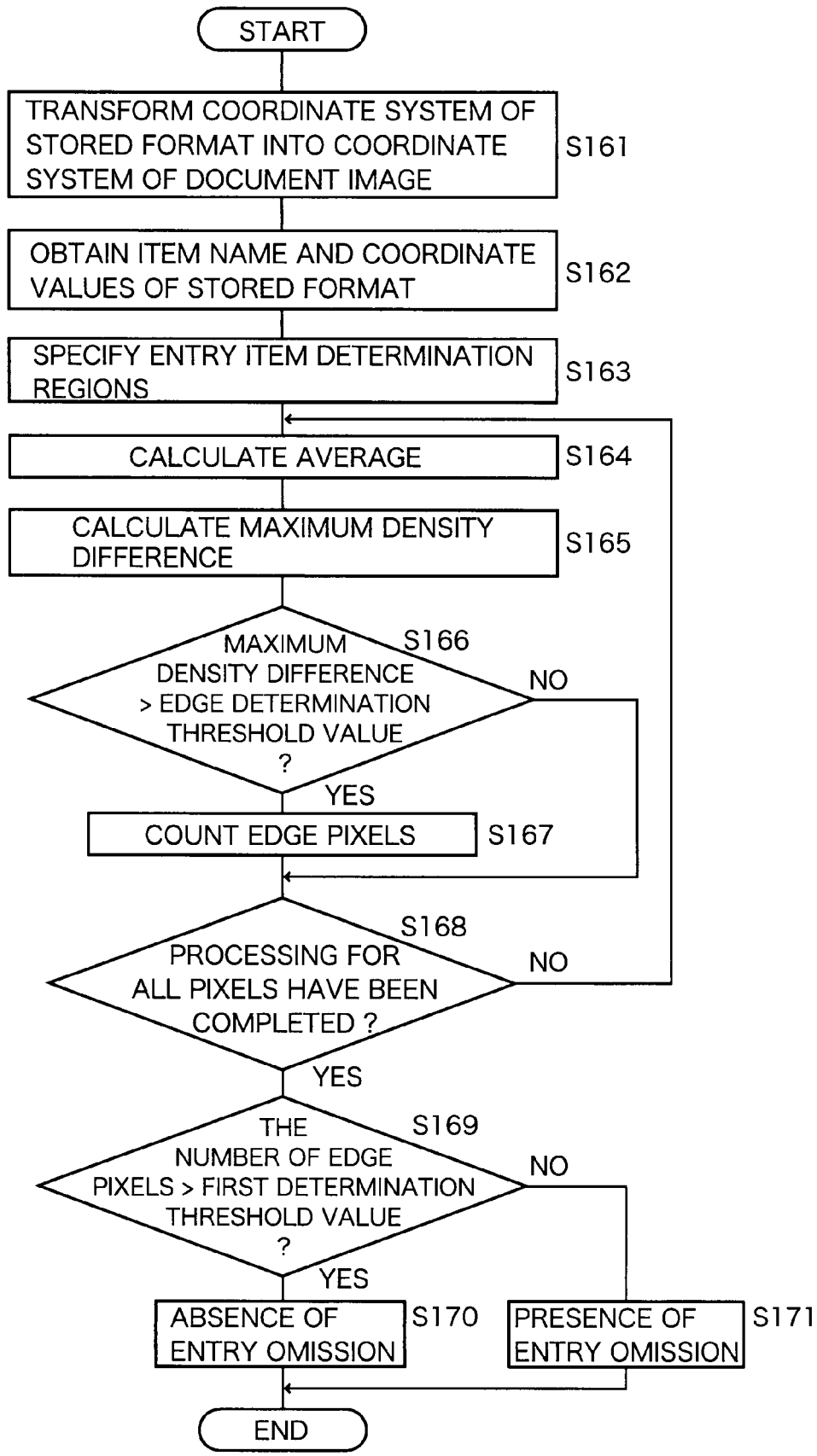
FIG. 40 is a flow chart showing a processing procedure of an entry item determination processing section according to Embodiment 7.

FIG. 40 is a flow chart showing a processing procedure in an entry item determination processing section 228 according to Embodiment 7. Here, similarly to the above-mentioned embodiment, in addition to being performed by a dedicated hardware circuit, the document matching process may be performed by a method in which a computer program that defines the procedure of document matching process is loaded onto a personal computer having a CPU, a RAM, a ROM, and the like and then the computer program is executed by the CPU.

The control section 227 transforms the coordinate system (coordinate values) of a stored format determined as being similar to the document image into the coordinate system (coordinate values) of the document image (S161). In this case, coordinate transformation may be performed on the entire stored format. Alternatively, coordinate transformation may be performed only on entry fields determined in advance in the stored format.

The control section 227 searches the determination area table 2265 and thereby obtains the item names and the coordinate values of the individual item names of the stored format determined as being similar to the document image (S162). Then, on the basis of the obtained coordinate values, the control section 227 specifies, on the document image, entry item determination regions where entry omission is to be determined (S163).

The control section 227 calculates the average of each pixel within the pixel block (the first pixel block) containing the current pixel (S164), and then searches the calculated average so as to calculate the maximum density difference in the first pixel block (S165).

The control section 227 determines whether the calculated maximum density difference is greater than an edge determination threshold value (e.g., 30) (S166). When the maximum density difference is greater than the edge determination threshold value (YES at S166), the control section 227 determines that the current pixel is an edge pixel, so as to count edge pixels (S167). At this time, the edge pixel counting is performed by adding 1 to the number of edge pixels at each time of determination as being an edge pixel. When the maximum density difference is not greater than the edge determination threshold value (NO at S166), the control section 227 performs the later-described processing of step S168, without counting the number of edge pixels.

The control section 227 determines whether processing for all the pixels in the document image have been completed (S168). When processing for all the pixels is not yet completed (NO at S168), the processing is changed to the next current pixel, and then the processing at and after step S164 is continued. When processing for all the pixels has been completed (YES at S168), that is, when the processing has been completed for all the pixels in the document image, the control section 227 determines whether the number of counted edge pixels is greater than a first determination threshold value (e.g., 5000) (S169).

When the number of edge pixels is greater than the first determination threshold value (YES at S169), the control section 227 concludes the absence of entry omission in the document image (S170), and then terminates the processing. In contrast, when the number of edge pixels is not greater than the first determination threshold value (NO at S169), the control section 227 concludes the presence of entry omission in the document image (S171), and then terminates the processing.

According to Embodiment 7, the presence or absence of entry omission can be determined only on the basis of the image data of a document image without using the image data of a stored format. Further, the average of the density values within a pixel block (the first pixel block) composed of a plurality of pixels containing the current pixel is calculated for each color component. This suppresses the influence of isolated points and noise at the time of reading and the influence of dirt in the base sheet of the document or dust adhering to the base sheet of the document. Accordingly, determination accuracy for the presence or absence of entry omission is improved.

Embodiment 8

In each embodiment described above, the presence or absence of entry omission has been determined in a document image. However, the present invention is not limited to determination for a document image, and may be applied to electronic data (data generated by application software) or electronized data (data generated by converting data read by a scanner into a predetermined file format such as JPEG and PDF).

For example, data provided in the form of electronic data or electronized data may be stored in a server. Then, the present invention in the form of application software may be applied to such data. Preferably, the data described here is stored separately for each electronic data and file format.

As for electronic data, several kinds of software can be used. Thus, for example, using a RIP (raster image processor), PDL (Page Description Language) may be interpreted and converted into a raster image (RGB data). Then, the method of the present invention may be applied.

Further, as for electronized data, for example, in the case of an encoded image format such as JPEG and GIF, the method of the present invention may be applied, after decoding is once performed and then color conversion processing of converting YCC signals into RGB signals is performed when necessary.

As for a PDF format, when the image data is saved in an encoded image format such as JPEG, the method of the present invention may be applied after decoding and conversion into RGB signals are performed. As for a vector data part such as a font, the method of the present invention may be applied after conversion into image data of RGB is performed by a RIP or the like. In the case of a PDF format, information concerning each object (such as a text, a diagram, and a photograph) is stored as a tag. Thus, the data conversion can be performed with reference to this information. For example, in the case of a text, the information concerning an object includes the font, the point size, the color, and the display position. In the case of a photograph, the information includes the coding method, the size, and the display position.

As described above, according to the present invention, in similarity determination for a document image, entry omission (erroneous omission) in the document image can be determined with satisfactory accuracy. Further, in the case of presence of entry omission, the part with entry omission can easily be determined.

Further, in the preceding stage of the determination whether a document image has entry omission, the page background removing is performed on the document image. Accordingly, even in a case that the paper sheet material of the read document is different from that of the stored image like recycled paper and thinly colored paper, the presence or absence of entry omission can be determined with satisfactory accuracy.

Further, this permits determination of entry omission in the document image with satisfactory accuracy only on the basis of the obtained document image without the necessity of comparison of the pixel values of the document image and the stored image. Furthermore, this suppresses the influence of isolated points in the document image and noise at the time of reading and the influence of dirt in the base sheet of the document or dust adhering to the base sheet. Accordingly, determination accuracy for entry omission is improved further.

Further, at the time of document delivery, this permits sorting into documents with entry omission and documents without entry omission. In particular, in a case that a large number of documents are to be read, documents with entry omission are easily sorted from among a large number of delivered documents. This improves the user's convenience. Further, documents with entry omission can easily be separated.

In the above-mentioned embodiment, the stored formats and the hash table 2262 have been stored in the memory 226 in advance. However, the present invention is not limited to this. That is, the stored formats may be stored in a storage section of a server apparatus connected to the image forming apparatus 100 through a communication line (network), while the hash table 2262 may be stored in the memory 226 in a distributed manner.

In the above-mentioned embodiment, the color image input apparatus 1 may be implemented by, for example, a flat-bed scanner, a film scanner, a digital camera, or a portable telephone. Further, the color image output apparatus 3 may be implemented by, for example: an image display device such as a CRT display and a liquid crystal display; or a printer employing an electrophotography method or an inkjet method that outputs the processing result onto a recording paper sheet or the like. Furthermore, the image forming apparatus 100 may be provided with a modem serving as communication means for connecting with a server apparatus and the like via a network. Further, in place of acquiring color image data from the color image input apparatus 1, the color image data may be obtained from an external storage device, a server apparatus, or the like via a network.

In the above-mentioned embodiment, the memory 226 and the control section 227 have been provided in the inside of the document matching process section 22. However, the present invention is not limited to this. That is, the memory 226 and the control section 227 may be provided in the outside of the document matching process section 22.

In the present invention, a program code for performing the document matching process, the entry omission notifying processing, the document delivery control processing, and the like may be recorded in a computer-readable recording medium used for carrying a program code (an executable form program, an intermediate code program, or a source program) to be executed by a computer. As a result, a recording medium that carries a program code for performing the above-mentioned processing is provided in a freely portable manner. In order that that processing can be performed by a microcomputer, the recording medium may be a program medium such as a memory (not shown) like a ROM. Alternatively, a program media of another type may be employed in which a program reading apparatus serving as an external storage device (not shown) is provided, and a recording medium is inserted into there so that the recording medium is read.

In these cases, the stored program code may be accessed and executed directly by a microprocessor. Alternatively, the program code may be read out, then the read-out program code may be downloaded into a program storage area (not shown) in a microcomputer, and then the program code may be executed. In this case, a computer program for download is stored in the main apparatus in advance.

Here, the above-mentioned program medium is a recording medium separable from the main body, and may be: a tape system such as a magnetic tape and a cassette tape; a disk system such as a magnetic disk (including a flexible disk and a hard disk) and an optical disk such as CD-ROM/MO/MD/DVD; a card system such as an IC card (including a memory card) and an optical card; and a medium that carry a program code in a fixed manner, including a semiconductor memory such as a mask ROM, an EPROM (Erasable Programmable Read Only Memory), an EEPROM (Electrically Erasable Programmable Read Only Memory), and a flash ROM.

Further, in this case, since the employed system configuration permits connection to a communication network including the Internet, the medium may carry the program code dynamically, for example, by means of downloading the program code from a communication network. Here, when the program code is to be downloaded from a communication network, a computer program for download may be stored in the main apparatus in advance, or alternatively may be installed from another recording medium. Here, the present invention may be implemented in the form of a computer data signal in which the above-mentioned program code is embedded in a carrier wave embodied by electronic transmission.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing method for determining presence or absence of a missing item in an obtained document image, comprising the steps of:
   determining whether the obtained document image is similar to a stored image;
   when the document image is determined as being similar to the stored image, determining whether the missing item is present in a part or parts in the obtained document image corresponding to a part or a plurality of parts defined in said stored image; and outputting a determination result.

2. The image processing method according to claim 1, further comprising the step of notifying the part with the missing item in the document image determined as having the missing item.

3. An image processing apparatus for determining presence or absence of a missing item in an obtained document image, comprising:
a controller capable of performing operations of:
determining whether the obtained document image is similar to a stored image stored; and
when the document image is determined as being similar to the stored image, determining whether the missing item is present in a part or parts in the obtained document image corresponding to a part or a plurality of parts defined in said stored image; and
a determination result output section for outputting a result determined by said controller.

4. The image processing apparatus according to claim 3, further comprising:
a notification section for notifying the part with the missing item in a document image determined as having the missing item.

5. The image processing apparatus according to claim 3, further comprising:
a page background removing section for removing the page background in the obtained document image, wherein
said controller is further capable of determining presence or absence of the missing item on the basis of the document image in which the page background has been removed by said page background removing section.

6. The image processing apparatus according to claim 3, wherein said controller is further capable of performing operations of
calculating a pixel value of each pixel in a first pixel block containing a current pixel in the obtained document image, on the basis of a pixel value of each pixel in a second pixel block containing the individual pixels in the first pixel block;
determining whether said current pixel is an edge pixel, on the basis of distribution of the calculated pixel values of the individual pixels in said first pixel block; and
determining whether the obtained document image has the missing item, on the basis of the number of current pixels determined as being edge pixels.

7. The image processing apparatus according to claim 6, wherein
when the obtained document image is a color image, the calculation of the pixel value of each pixel in said first pixel block and the determination whether the current pixel is an edge pixel are performed separately for each color component.

8. A document reading apparatus comprising:
a document reading section for reading a plurality of documents;
an image processing apparatus according to claim 3; and
a document delivery section for delivering in a sorted manner a document with the missing item when the image processing apparatus determines that the document image read by said document reading section has the missing item.

9. The document reading apparatus according to claim 8, wherein said document delivery section displaces a delivery position for a document with the missing item relative to a delivery position for a document without the missing item.

10. An image forming apparatus comprising:
an image processing apparatus according to claim 3; and
an image forming section for forming an output image on the basis of the image processed by the image processing apparatus.

11. An image processing apparatus for determining presence or absence of a missing item in an obtained document image, comprising:
a similarity determination processing section for determining whether the obtained document image is similar to a stored image stored;
an entry item determination processing section that, when the document image is determined as being similar to the stored image, determines whether the missing item is present in a part or parts in the obtained document image corresponding to a part or a plurality of parts defined in said stored image; and
a determination result output section for outputting a determination result.

12. The image processing apparatus according to claim 11, further comprising:
a notification section for notifying the part with the missing item in a document image determined as having the missing item.

13. The image processing apparatus according to claim 11, further comprising:
a page background removing section for removing the page background in the obtained document image, wherein
said entry item determination processing section determines presence or absence of the missing item on the basis of the document image in which the page background has been removed by said background removing section.

14. The image processing apparatus according to claim 11, further comprising:
a pixel value calculating section for calculating a pixel value of each pixel in a first pixel block containing a current pixel in the obtained document image, on the basis of a pixel value of each pixel in a second pixel block containing the individual pixels in the first pixel block; and
an edge pixel determining section for determining whether said current pixel is an edge pixel on the basis of distribution of the calculated pixel values of the individual pixels in said first pixel block; wherein
said entry item determination processing section determines whether the obtained document image has the missing item, on the basis of the number of current pixels determined as an edge pixel by said edge pixel determining section.

15. The image processing apparatus according to claim 14, wherein
when the obtained document image is a color image, each of said pixel value calculating section and said edge pixel determining section performs processing separately for each color component.

16. A document reading apparatus comprising:
a document reading section for reading a plurality of documents;
an image processing apparatus according to claim 11; and
a document delivery section for delivering in a sorted manner a document with the missing item when the image processing apparatus determines that the document image read by said document reading section has the missing item.

17. The document reading apparatus according to claim 16, wherein said document delivery section displaces a delivery position for a document with the missing item relative to a delivery position for a document without the missing item.

18. An image forming apparatus comprising:
  an image processing apparatus according to claim 11; and
  an image forming section for forming an output image on the basis of the image processed by the image processing apparatus.

19. A non-transitory recording medium storing thereon a computer program executable to perform the steps of:

causing a computer to determine whether the obtained document image is similar to a stored image stored; and when the document image is determined as being similar to the stored image, causing a computer to determine whether a missing item is present in a part or parts in the obtained document image corresponding to a part or a plurality of parts defined in said stored image.

\* \* \* \* \*